(12) United States Patent
Pildysh

(10) Patent No.: US 11,091,852 B2
(45) Date of Patent: Aug. 17, 2021

(54) SYSTEMS AND METHODS FOR PROCESSING WHOLE PLANT MATERIALS INTO SEPARATED COMPONENTS

(71) Applicant: Canadian Greenfield Technologies Corp., Calgary (CA)

(72) Inventor: Mikhail Pildysh, Calgary (CA)

(73) Assignee: Canadian Greenfield Technologies Corp., Calgary (CA)

( * ) Notice: Subject to any disclaimer, the term of this patent is extended or adjusted under 35 U.S.C. 154(b) by 92 days.

(21) Appl. No.: 16/448,917

(22) Filed: Jun. 21, 2019

(65) Prior Publication Data

US 2020/0398285 A1 Dec. 24, 2020

(51) Int. Cl.
| | | |
|---|---|---|
| *D01B 1/22* | (2006.01) | |
| *B02C 23/10* | (2006.01) | |
| *A01D 87/12* | (2006.01) | |
| *B01J 2/12* | (2006.01) | |
| *A01F 29/00* | (2006.01) | |

(52) U.S. Cl.
CPC ............... *D01B 1/22* (2013.01); *B02C 23/10* (2013.01); *A01D 87/127* (2013.01); *A01D 2087/128* (2013.01); *A01F 29/005* (2013.01); *B01J 2/12* (2013.01)

(58) Field of Classification Search
CPC ...... D01B 1/22; A01D 29/005; A01D 87/127; A01D 2087/128; B02C 23/10; B02C 18/144; B01J 2/12
See application file for complete search history.

(56) References Cited

U.S. PATENT DOCUMENTS

| | | | | |
|---|---|---|---|---|
| 1,447,449 A | * | 3/1923 | Wessel | D01B 1/22 19/5 R |
| 2,957,209 A | * | 10/1960 | Schulze | D01B 1/14 19/9 |
| 4,959,038 A | * | 9/1990 | Ragsdale | A01F 11/00 460/100 |
| 5,316,150 A | | 5/1994 | Fisher | |

(Continued)

FOREIGN PATENT DOCUMENTS

WO 2019071361 A1 4/2019

OTHER PUBLICATIONS

Office Action issued in corresponding CA Application No. 3,047,756 dated Apr. 20, 2020 (7 pages).

(Continued)

*Primary Examiner* — Shaun R Hurley
(74) *Attorney, Agent, or Firm* — Osha Bergman Watanabe & Burton LLP

(57) ABSTRACT

A system for processing plant materials is described. The plant materials have at least plant stalks, and the plant stalks comprise at least bast fibers. The system has a crusher module for disrupting the plant materials without breaking or damaging the bast fibers thereof, thereby obtaining disrupted plant stalks and a first plant-remainder; a decorticator module coupled to the crusher module for separating the disrupted plant stalks into bast fibers as a first product and a second plant-remainder; and a screening module coupled to the decorticator module for separating at least the second plant-remainder to microfibers and hurds as a second and a third product, respectively.

28 Claims, 29 Drawing Sheets

(56) References Cited

U.S. PATENT DOCUMENTS

| | | | | |
|---|---|---|---|---|
| 5,507,074 | A | * | 4/1996 | Chen .................. D01B 1/40 |
| | | | | 19/5 A |
| 5,970,582 | A | * | 10/1999 | Stover ................. D01B 1/02 |
| | | | | 19/24 |
| 6,079,647 | A | | 6/2000 | Leduc et al. |
| 7,669,292 | B2 | * | 3/2010 | Chute .................. D01B 1/50 |
| | | | | 19/5 R |
| 2008/0289149 | A1 | | 11/2008 | Chute et al. |
| 2018/0103591 | A1 | | 4/2018 | Jin |

OTHER PUBLICATIONS

Notice of Allowance issued in corresponding CA Application No. 3,047,756 dated Sep. 28, 2020 (1 page).

* cited by examiner

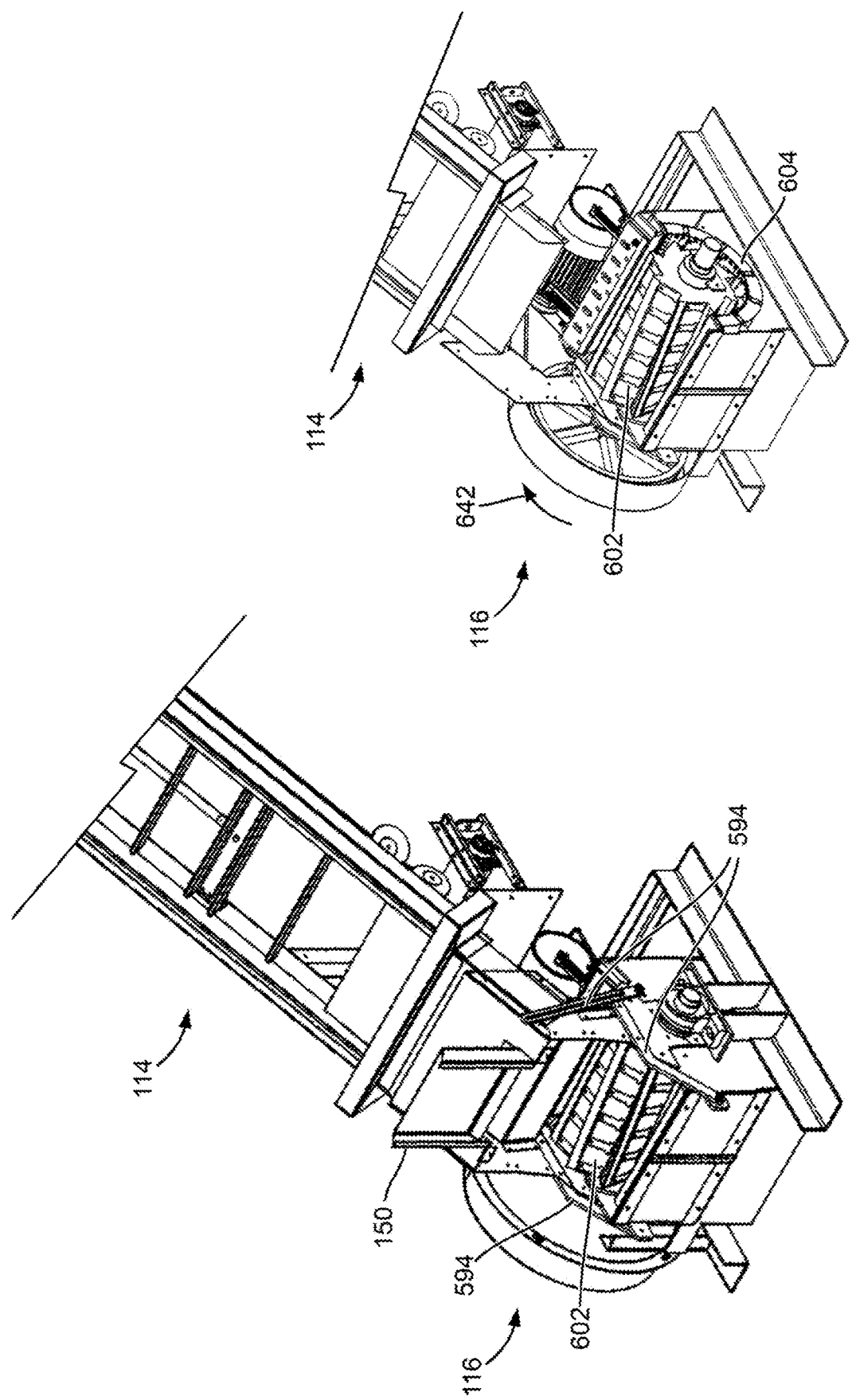

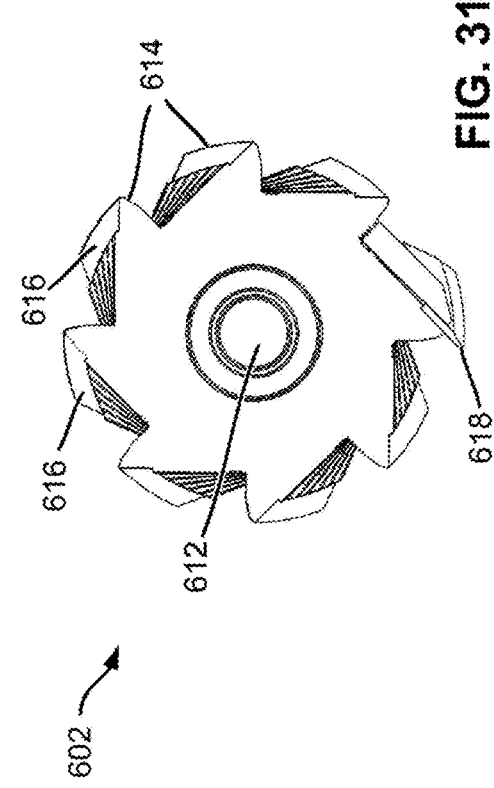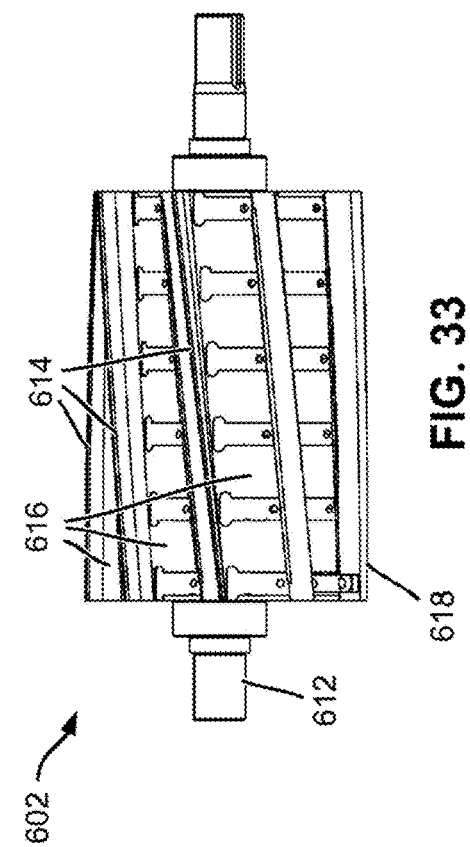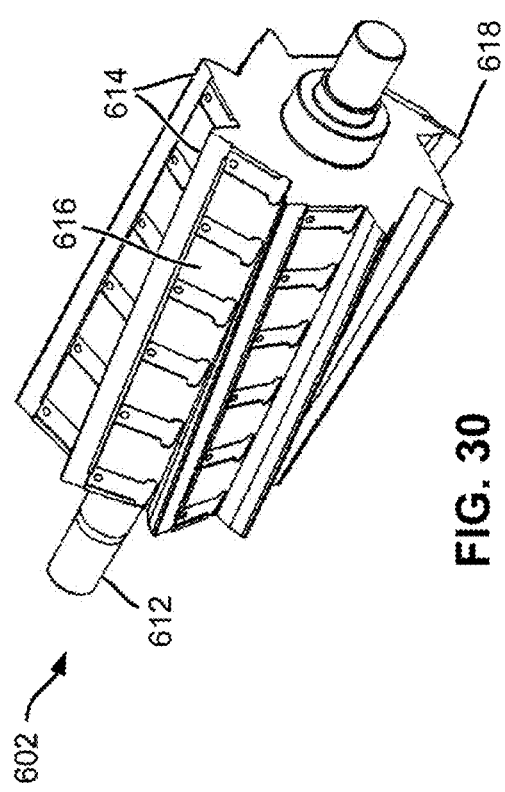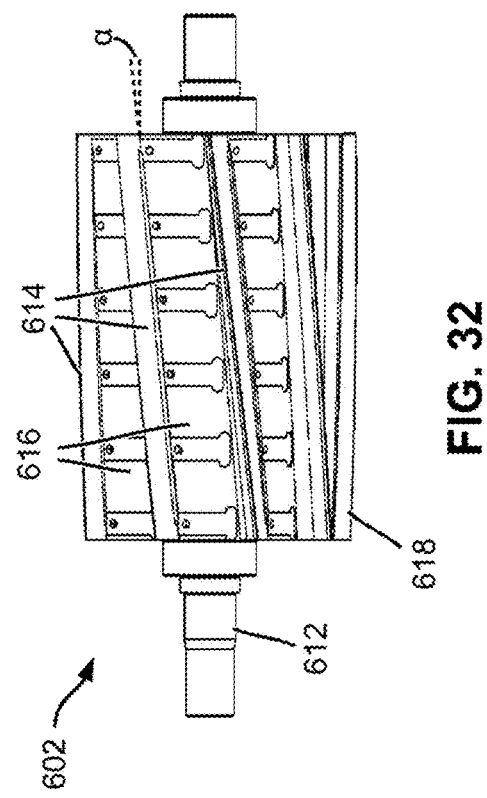

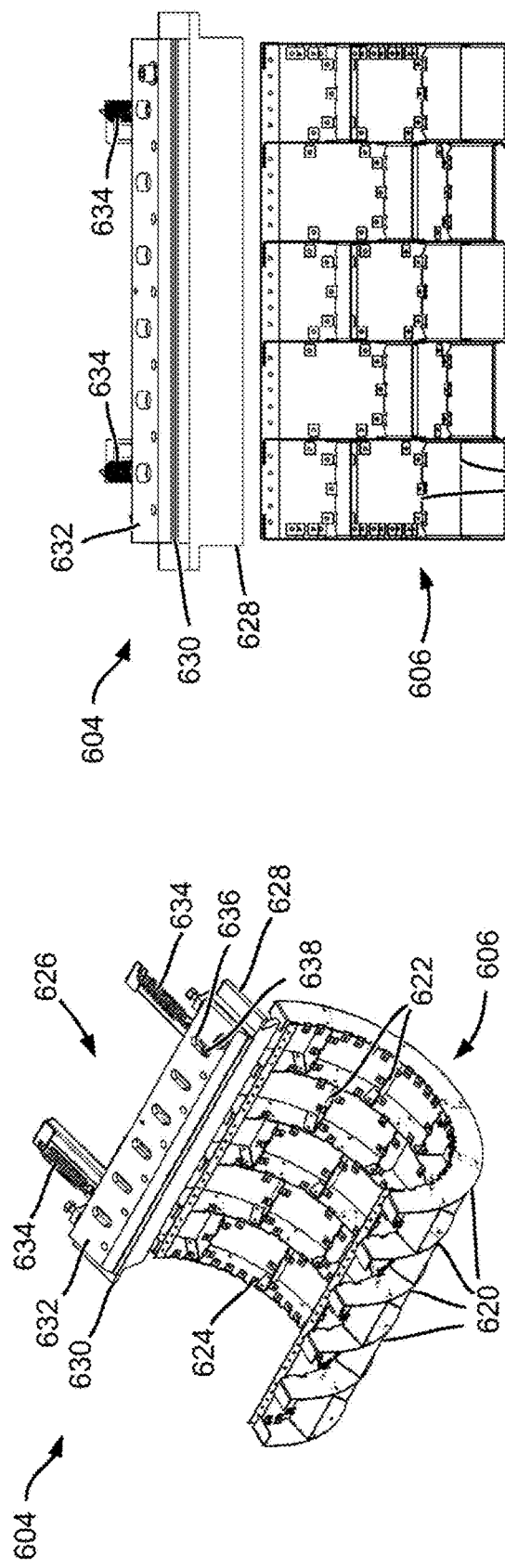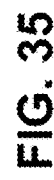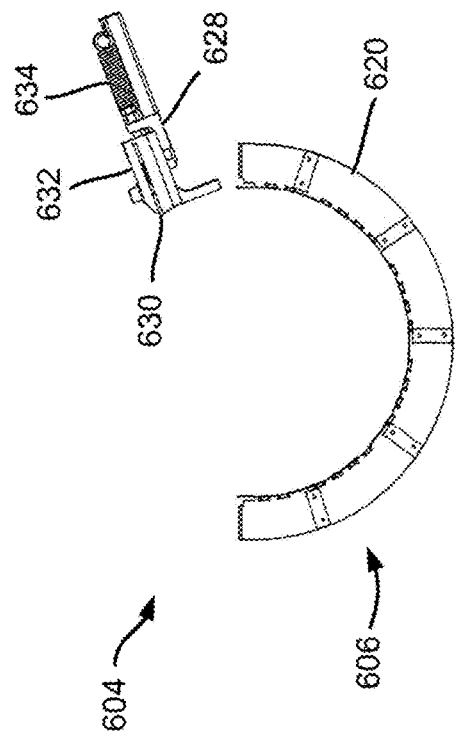

SYSTEMS AND METHODS FOR PROCESSING WHOLE PLANT MATERIALS INTO SEPARATED COMPONENTS

FIELD OF THE DISCLOSURE

The present disclosure relates generally to a plant-processing system and method, and in particular to a plant-processing system method for producing bast fibers, green microfibers, and hurds.

BACKGROUND

Bast fibers are long, strong, cellulosic fibers obtained from the inner bark (also called "bast" or "phloem") of the stalks or stems of certain dicotyledonous plants such as hemp, flax, canola, jute, cannabis, and the like. Bast fibers have been widely used in a variety of areas such as netting or matting (e.g., for making carpet, yarn, rope, geotextile, and the like), paper, non-woven mats and carpets, composite boards, and the like.

Bast fiber products such as the NFORCE-FIBER® and NFORCE-PRO™ (NFORCE-FIBER is a registered trademark of the Applicant, Canadian Greenfield Technologies Corp., Calgary, AB, CA; NFORCE-PRO is a trademark of the Applicant) base fibers for concrete may also be processed and used as additives of concrete. Such processed bast fibers act as a reinforcement material for concrete structures and facilitate the concrete to form high quality surfaces for use in various projects such as skateparks, pools, light-rail train (LRT) lines, bobsleigh tracks, and the like.

In addition to bast fibers, the stalks of such dicotyledonous plants also comprise other useful materials such as the woody soft-core of the stalks surrounded by the bast fibers. Such soft-core materials are usually obtained in the form of hurds or shives after processing of the plant stalks, and may be used for making paper, particleboard, construction composites, animal bedding, and the like.

Moreover, some plants such as hemp may also comprise cannabidiol (CBD) which may be useful for pain relief and anti-inflammation, and may be used in various areas such as hemp-infused food and beverages, skin-care products, and the like. While CBD is generally of higher concentration in plants' leaves and seeds, the stalks thereof may also have a significant amount of CBD and other bio-nutrients (e.g., terpenes, glucose, hemi-cellulose, and the like) in their shives or hurds.

For example, US Patent Publication No. 2018/0304274 to Bates teaches a method for processing hemp to form a dry hemp product including cannabinoid (CDB) oil. The method comprises steps of: (i) cutting hemp plants growing in a field between about 85 days and about 120 days after seeding, such that the hemp plants include at least one of leaves and flower buds but are free of seed; (ii) drying the hemp plants to a prescribed moisture content of about 5% to about 15%, by leaving the hemp plants in the field to air dry; (iii) shaking the hemp plants to shear said at least one of the leaves and the flower buds from stalks of the hemp plants so as to form separated stalks and said at least one of the leaves and the flower buds which are not deformed; and (iv) screening the separated stalks and the leaves and/or the flower buds so as to be separated from one another.

Generally, decorticators are used for producing bast fibers from plant stalks. The hurds separated therefrom may be disposed or alternatively recycled for above-described uses. Conventional decorticators usually employ a hammer mill or a hammer mill-like mechanism to beat the plant stalks for separating the bast fibers therefrom, and output the remainder as hurds. However, such decorticators may damage the bast fibers thereby weakening or even destroying the structural strength thereof, and cause the obtained bast fibers to be unsuitable for use as a reinforcement material or cause attrition of hurd fiber.

US Patent Publication No. 2018/0103591 to Jin teaches a method of processing of baled material including a bale-opening stage, a separation stage, and a decortication stage.

The bale opener features a conveyor moving incoming bales toward a toothed extractor having an array of teeth driven on a revolutionary path moving upwardly past the adjacent end of the conveyor to rake through the bale and extract material therefrom. The conveyor tilts upward reduce a working angle between the conveyor and the toothed extractor to urge the shrinking bale toward the moving teeth.

A separation stage features multiple sets of vertically stacked, counter-rotating rollers with different characteristics from one set to the next. A decorticator has an external container, an internal drum rotatably supported therein, and an array of teeth on the drum. Driven rotation of the internal drum spins the fibrous stalks around the internal drum and impacts the fibrous stalks against surrounding interior wall surfaces of the external container.

The method of US 2018/0103591 separates bast fibers from the hurds, and further separates bast fibers into long fibers and short fibers. However, the separated hurds may comprise shives of various sizes including small-size microbiomass that may not be suitable for use with larger-size hurds for their common purposes for example, for making paper, particleboard, construction composites, animal bedding, and the like.

SUMMARY

According to one aspect of this disclosure, there is provided a system for processing harvested plant stalks, said plant stalks comprising at least bast fibers. The system comprises: a crusher module for disrupting the plant stalks without breaking or damaging the bast fibers thereof, thereby obtaining disrupted plant stalks and plant stalk fragments; a decorticator module coupled to the crusher module for separating the disrupted plant stalks into bast fibers as a first product and a remainder of the plant stalks; and a screening module coupled to the decorticator module for separating the remainder of the plant stalks to microfibers and hurds as a second and a third product, respectively.

In some embodiments, the screening module is shakable along at least one direction.

In some embodiments, the crusher module is also coupled to the screening module for outputting the plant stalk fragments thereto.

In some embodiments, the decorticator module is coupled to the screening module via at least a first conveyor module for outputting the remainder of the plant stalks thereto.

In some embodiments, the decorticator module is coupled to the screening module via the first conveyor module and a second conveyor module coupled to the first conveyor module.

In some embodiments, the second conveyor module is an inclined conveyor having a first end coupled to first conveyor module and a second end at an elevation higher than the first end.

In some embodiments, the crusher module is coupled to the first conveyor module for coupling to the screening module.

In some embodiments, the system further comprises: a bale-opener module coupled to the crusher module for receiving bales of the plant stalks, extracting plant stalks from the received bales, and outputting extracted plant stalks to the crusher module.

In some embodiments, the system further comprises: an input conveyor module having an end portion rearwardly and downwardly extending to the bale-opener module.

In some embodiments, the bale-opener module is also coupled to the screening module for outputting plant stalk fragments obtained during the extraction of the plant stalks from the received bales.

In some embodiments, the bale-opener module is coupled to a third conveyor module and the third conveyor module is coupled to the first conveyor module for coupling the bale-opener module to the screening module.

In some embodiments, the system further comprises: an attrition module intermediate and coupled to the screening module and at least the decorticator module for receiving the remainder of the plant stalks from the decorticator module, attriting the received remainder of the plant stalks, and outputting the attrited remainder of the plant stalks to the screening module.

In some embodiments, the attrition module is intermediate and coupled to the first conveyor module and the screening module.

In some embodiments, the attrition module is intermediate and coupled to the first and second conveyor modules.

In some embodiments, the system further comprises: a cutter module coupled to the screening module for sizing the separated hurds.

In some embodiments, the system further comprises: an additive feeder module coupled to the cutter module for adding bulk additive thereto.

In some embodiments, the system further comprises: a dust collection structure for collecting dusts generated in the system.

In some embodiments, the dust collection structure is coupled to each of the modules via a plurality of ducts.

In some embodiments, each of the modules comprises walls forming an enclosure receiving the module therein for preventing dust from escaping the module.

According to one aspect of this disclosure, there is provided a module for opening a bale of plant stalks. The module comprises: an inclined bale-opener conveyor for extracting plant stalks from the bale and lifting extracted plant stalks to an higher elevation, the inclined conveyor comprising one or more laterally extending slats distributed thereon, each slat comprising a plurality of teeth for extracting plant stalks from the bale; a rotatable first drum on a front side of the bale-opener conveyor at an elevation about an upper portion thereof for regulating the extracted plant stalks, the rotatable drum comprising one or more laterally extending blades distributed thereon; a pair of adjacent rollers on a rear side of the bale-opener conveyor at an elevation lower than a top end thereof for receiving the plant stalks falling from the top of the bale-opener conveyor; a rotatable second drum and a drum base spaced from each other and under the pair of rollers for disentangling the plant stalks falling from the pair of rollers, the drum base comprising an arc-shaped surface about the rotatable second drum and a plurality of laterally extending ridges circumferentially distributed on the arc-shaped surface, the rotatable second drum comprising one or more laterally extending blades distributed thereon; and a guide under the rotatable second drum and the drum base for receiving the plant stalks falling from thereabove and outputting the received plant stalks.

In some embodiments, the module further comprises: a first chute extending rearwardly and upwardly from a first location adjacent the pair of rollers.

In some embodiments, the module further comprises: a second chute extending forwardly and upwardly from a second location adjacent the pair of rollers.

In some embodiments, the module further comprises: a third chute extending rearwardly and upwardly from a third location adjacent the top of the bale-opener conveyor.

In some embodiments, the module further comprises: an input conveyor engageable with the bale-opener conveyor for conveying the bale thereto.

In some embodiments, the input conveyor comprising and portion extending rearwardly and downwardly towards the bale-opener conveyor.

In some embodiments, the input conveyor is spaced from the bale-opener conveyor thereby forming a gap therebetween.

In some embodiments, the module further comprises: a fine conveyor under the gap between the input conveyor and the bale-opener conveyor.

According to one aspect of this disclosure, there is provided a module for disrupting plant stalks without damaging bast fibers thereof. The module comprises: a pair of adjacent rollers for disrupting the plant stalks passing therebetween, each roller comprising a plurality of laterally extending ridges thereon.

In some embodiments, the pair of rollers comprise an upper roller and a lower roller with the lower roller fixed at a predefined position and the upper roller coupled to a biasing structure and vertically movable.

According to one aspect of this disclosure, there is provided a module for separating bast fibers from plant stalks, the module comprises: at least one drum assembly; the at least one drum assembly comprises: a pair of rollers, and a rotatable drum and a drum base spaced from each other and located at a rear side of the pair of rollers; the rotatable drum comprises one or more laterally extending blades distributed thereon; and the drum base comprises a plurality of laterally extending rods spaced from each other and distributed about the rotatable drum.

In some embodiments, the drum base further comprises a pair of opposite sidewalls for supporting the plurality of rods.

In some embodiments, the at least one drum assembly further comprises a first chute extending upwardly and rearwardly from a first position adjacent the rotatable drum.

In some embodiments, the at least one drum assembly further comprises a second chute extending upwardly from a second position adjacent the rotatable drum.

In some embodiments, the at least one drum assembly further comprises a third chute extending forwardly and upwardly from a third position adjacent the rotatable drum.

In some embodiments, the module further comprises: a first conveyor coupled to a front side of the at least one drum assembly.

In some embodiments, the module comprising two drum assemblies with a second conveyor intermediate and coupled thereto.

In some embodiments, the module further comprises: a third conveyor under the at least one drum assembly.

According to one aspect of this disclosure, there is provided a module for sizing plant hurds. The module comprises: a rotatable grinder; and a grinder base adjacent the rotatable grinder and at distance thereto; the grinder comprising: a plurality of ridges, each ridge laterally extending and at an acute angle to an axis of the grinder, each ridge comprising a mounting surface, and one or more first blades, each blade coupled to the mounting surface of respective one of the ridges and engageable with an inner surface of the grinder base; and the grinder base comprises: a plurality of aligned semi-circular frame components spaced from each other, each frame component comprising a surface thereby forming the inner surface of the grinder base;

In some embodiments, the grinder base further comprises a plurality of reinforcement bars coupled between adjacent pairs of the frame components.

In some embodiments, the grinder base further comprises a second blade located at a rear end thereof.

BRIEF DESCRIPTION OF THE DRAWINGS

FIG. 28 is a perspective view of a cutter of the plant-processing system shown in
FIG. 7;

FIG. 29 is a perspective view of the cutter shown in FIG. 28 with some components removed for illustrating the internal structure thereof;

FIG. 30 is a perspective view of a grinder of the cutter shown in FIG. 28;

FIG. 31 is a side view of the grinder shown in FIG. 30;

FIG. 32 is a front view of the grinder shown in FIG. 30;

FIG. 33 is a rear view of the grinder shown in FIG. 30;

FIG. 34 is a perspective view of a grinder base of the cutter shown in FIG. 28;

FIG. 35 is a front view of the grinder base shown in FIG. 34;

FIG. 36 is a side view of the grinder base shown in FIG. 34;

DETAILED DESCRIPTION

Embodiments herein disclose plant-processing systems and methods for processing plant materials into separated products including bast fibers, hurds, and green microfibers (described in more detail later).

The plant materials may be harvested dicotyledonous plants comprising bast fibers in the inner bark of the stalks thereof and hurds surrounded by the inner bark. In some embodiments, such plant materials may be bales of hemp, flax, cannabis, and the like. In some embodiments, such plant materials may also be canola, jute, and the like.

The plant-processing systems disclosed herein provide improved hemp decortication and separate baled plant materials such as baled hemp into high-value products, including bast fibers with substantively intact structures, selectively-sized hurd granules, cannabidiol (CBD), and bio-nutrients rich green microfibers (e.g., rich in terpenes, glucose, hemi-cellulose, and the like).

In some embodiments, the plant materials to be processed may be whole plants having stalks and other plant components such as leaves, buds, flowers, seeds, and/or the like thereon. After processing, the bast fibers in the plant stalks are produced as a first product, the hurds in the plant stalks are produced as a second product, and fragments of the plants obtained during processing, including fragments of the plant stalks, leaves, buds, flowers, seeds, and other plant components are generally processed and produced as a third, green microfiber or micro-biomass product.

In comparison, conventional plant-processing systems may turn about 25% to 40% of input plant materials into dust, and usually do not produce the third, green microfiber product.

In some other embodiments, the plants to be processed may be substantively plant stalks. Those skilled in the art will understand that while the system may still process the plant stalks into above-mentioned three products, the quantity of the third product may be reduced.

In various embodiments, the plant materials to be processed may be dried plant materials and/or undried plant materials with moisture, although moisture may impact the degree of cleaningness of bast fiber/hurds as it is usually preferable that the produced hurds are brittle. In some embodiments, the plant materials to be processed may preferably have a controlled moisture of no more than 20% to avoid molding.

In some embodiments, a dust collector may be used for significantly reducing or completely preventing dust generation.

In some embodiments, the system disclosed herein employs high-speed kinematic action for producing the three output streams (i.e., bast fibers, hurd granules, and green microfibers).

Figure 1:
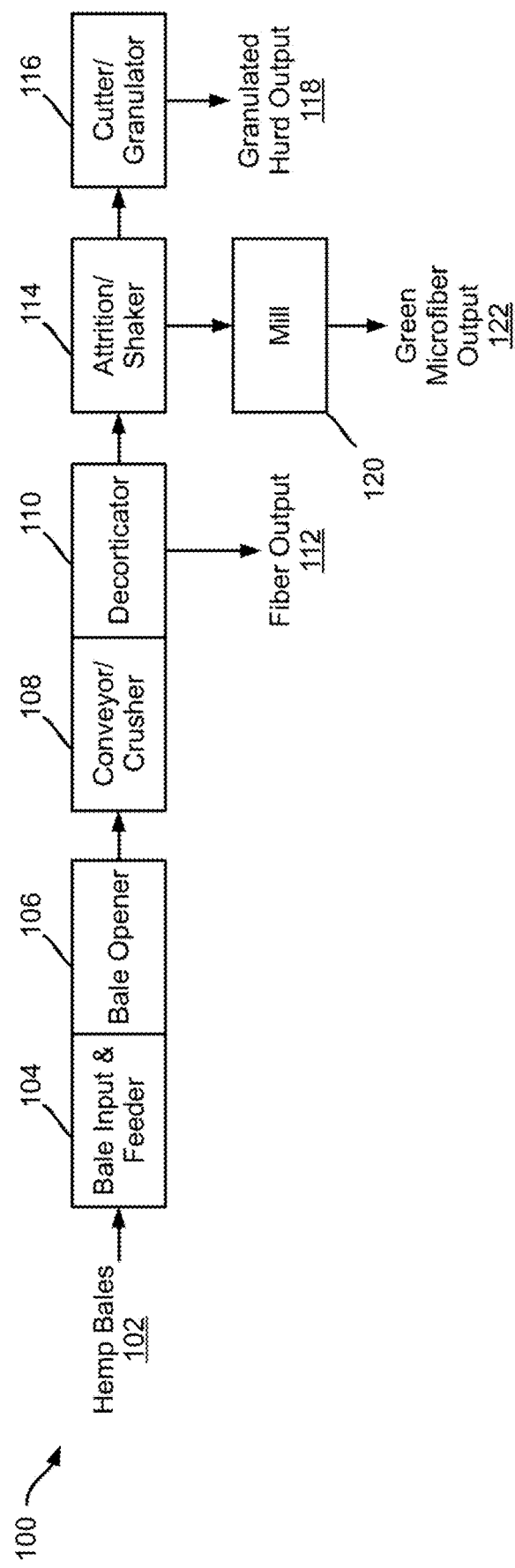
FIG. 1 is a block diagram showing the structure of a plant-processing system, according to some embodiments of this disclosure.

Turning now to FIG. 1 a plant-processing system is shown and is generally identified using reference numeral 100. The plant-processing system 100 comprises a plurality of modules and may be used for processing bast-fiber plants. For example, in some embodiments, the plant-processing system 100 may be used for processing hemp, flax, cannabis, and the like. In some other embodiments, the plant-processing system 100 may also be used for processing canola, jute, and the like.

In the following, the bast-fiber plants are simply denoted as plants hereinafter for ease of description, and hemp may be used as an example in the description of the plant-processing system 100.

As described above, the plants to be processed may be whole plants and/or mainly plant stalks. While the following uses the term "plant stalks" for ease of description, those skilled in the art will understand that the plant stalks described herein after may comprise other plant components such as leaves, buds, flowers, seeds, and/or the like.

As will be described in more detail below, the plant-processing system 100 employs a plurality of rotatable drums and rollers. Such drums and rollers may be in cylindrical forms (although other suitable forms are also readily available) with necessary components such as spindles, axes, driven sprockets, and the like for allowing them to be driven to rotate.

As shown in FIG. 1, the plant-processing system 100 comprises a bale-opener module 106 (or simply denoted "a bale opener") with a bale-input module 104 (also denoted "a bale input and feeder") for receiving and opening plant bales which are substantively tightly bundled plant stalks. The opened bales or more specifically, the plant stalks extracted from the bales are then fed into a crusher module 108 via a conveyor for initial processing.

The crusher 108 breaks up or disrupts the plant stalks without breaking or damaging the bast fibers. The woody soft-core of the plant stalks are crushed into shives (i.e., hurds) of various sizes. A portion of the soft-core and other components of the plant stalks may be crushed into fragments or smaller-sized micro-biomass.

The crusher 108 feeds the crushed plant stalks into a decorticator module 110 for producing bast fiber 112. The rest of the crushed plant stalks, mainly the hurds and micro-biomass, are fed into an attrition/shaker module 114 for separating the hurds and micro-biomass. The hurds are fed into a cutter or granulator module 116 for generating granulated hurds 118 substantively of a selected size.

In some embodiments, the selected size is a predefined size. In some other embodiments, the selected size may be adjustable by an operator of the plant-processing system 100. Moreover, those skilled in the art will appreciate that while the selected size is used, the actual sizes of granulated hurds 118 may vary within a reasonable range about the selected size.

The micro-biomass separated from the attrition/shaker 114 mainly comprises green microfibers 122 with a significant concentration of CBD and various other bio-nutrients such as terpenes, glucose, hemi-cellulose, and the like. The micro-biomass output from the attrition/shaker 114 may be optionally milled by a mill module 120 for obtaining fine-size green microfibers 122.

Thus, the plant-processing system 100 separate baled plant materials into high-value products, including bast fibers with substantively intact structural integrity and strength, selectively-sized hurd granules, CBD, and nutrient-rich green microfibers.

Figure 2:
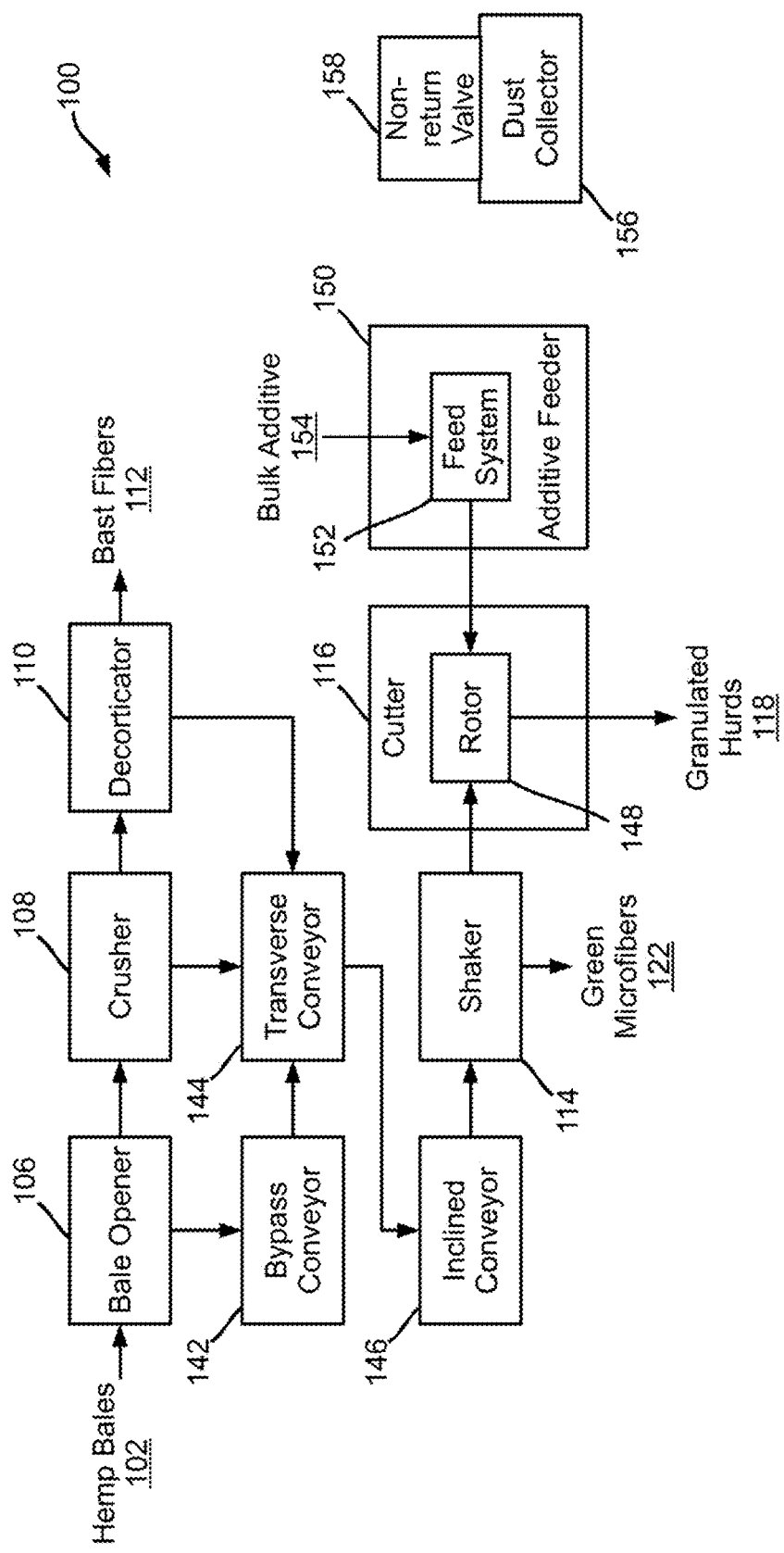
FIG. 2 is a block diagram showing the structure of a plant-processing system, according to some alternative embodiments of this disclosure.

FIG. 2 is a block diagram showing the structure of a plant-processing system 100 according to some alternative embodiments of this disclosure. As shown, the plant-processing system 100 in these embodiments comprises a bale opener 106 with a bale input and feeder 104 (not shown in FIG. 2) for receiving and opening plant bales. After a bale is opened, the plant stalks are fed into a crusher 108 via a conveyor (not shown).

As those skilled in the art will appreciate, the bale may comprise some disrupted plant stalks. Moreover, when opening bales, the bale opener 106 may also break some plant stalks into fragments. In these embodiments, such disrupted plant stalks or broken fragments are separated in the bale opener 106 and fed to a bypass conveyor 142 for producing green microfibers 122 and granulated hurds 118 therefrom, and may bypass the processing steps for producing bast fibers.

The crusher 108 receives plant stalks from the bale opener 106 and breaks up the plant stalks without breaking or damaging the bast fibers. The woody soft-core of the plant stalks are crushed into shives or hurds of various sizes. A portion of the soft-core and other components of the plant stalks may be crushed into smaller-sized micro-biomass.

The crusher 108 feeds the crushed plant stalks into a decorticator 110 for producing bast fiber 112. The rest of the crushed plant stalks, mainly the hurds and micro-biomass, are fed into a transverse conveyor 144.

The decorticator 110 separates bast fibers from hurds and outputs the separated bast fibers 112 to a fiber collector (not shown). The separated hurds are conveyed to the transverse conveyor 144.

The transverse conveyor 144 collects the plant material, which is substantively hurds and small-size micro-biomass, from the bypass conveyor 142 (in the form of the broken stalks), the crusher 108, and the decorticator 110, and conveys the collected plant material to an inclined conveyor 146 which in turn conveys the plant material to a shaker 114.

The shaker 114 separates the hurds from the small-size micro-biomass. The hurds are fed into a cutter or alternatively a granulator 116 and the micro-biomass is output as green microfibers 122. Similar to the embodiments shown in FIG. 1, the mill (not shown) may be used for milling the green microfibers 122 to a fine size.

The cutter 116 receives the hurds from the shaker 114 and may also receive bulk additive 154 from the feed system 152 of an additive feeder 150. The bulk additive 154 may be any suitable additive. For example, in some embodiments, sodium carbonate (e.g., baking soda) may be added through the additive feeder 150 and mixed with the granulated hurds in the cutter 116 for producing cat-litter products in which sodium carbonate is used for odor suppression.

In some embodiments, fertilizer additive, such as fertilizer additive in a powder form, may be added through the additive feeder 150 and mixed with the granulated hurds in the cutter 116 for producing soil-improvement products in which include hurds is used for aeration.

The cutter 116 comprises a rotor 148 for substantively granulating the received hurds and additives to a selected granule-size (predefined or alternatively adjustable by an operator) and producing the granulated hurds 118.

In these embodiments, a dust collector 156 having a non-return valve 158 (e.g., a check valve) is used for significantly reducing or completely preventing dust generation. A set of ducts or pipes (not shown) connect various modules of the plant-processing system 100 to the dust collector 156 for removing dusts therefrom into the dust collector 156.

Figure 3:
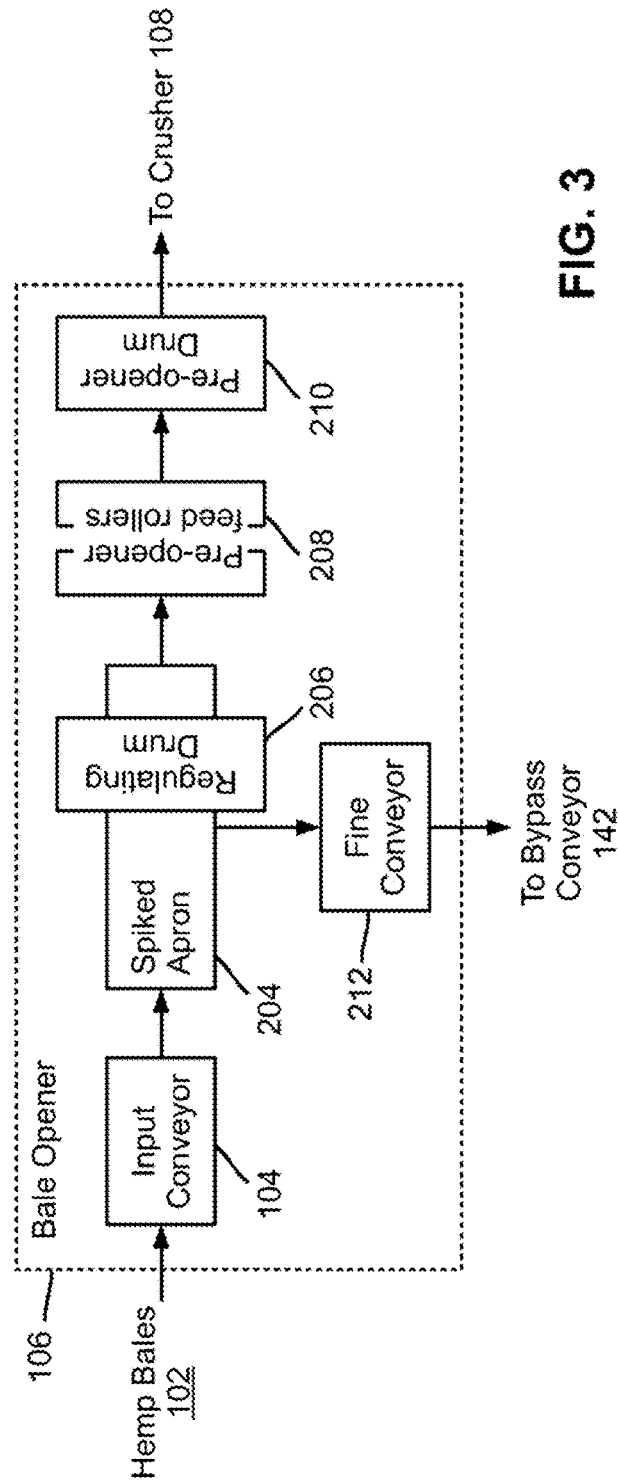
FIG. 3 is a block diagram showing the structure of a bale opener of the plant-processing system shown in FIG. 2.

FIG. 3 shows the details of the bale opener 106. As shown, the bale opener 106 in these embodiments comprises an input conveyor as the bale input and feeder 104 for receiving plant bales 102. The input conveyor 104 conveys the plant bales 102 to a movable endless spiked-apron 204 and a rotatable regulating drum 206 for opening the bales 102. The plant stalks of the opened bales 102 then pass through a pair of high-speed pre-opener feed rollers 208 and a rotatable pre-opener drum 210 and are fed to the crusher 108. In these embodiments, the pre-opener drum 210 may rotate at a high speed such as at a speed between about 400 and about 800 revolutions per minute (RPM).

As described above, the bales 102 may comprise some disrupted plant stalks. Moreover, the spiked apron 204 may also break some plant stalks. The disrupted and/or broken plant stalks are fed from the spiked apron 204 to a fine conveyor 212 for conveying to the bypass conveyor 142.

Figure 4:
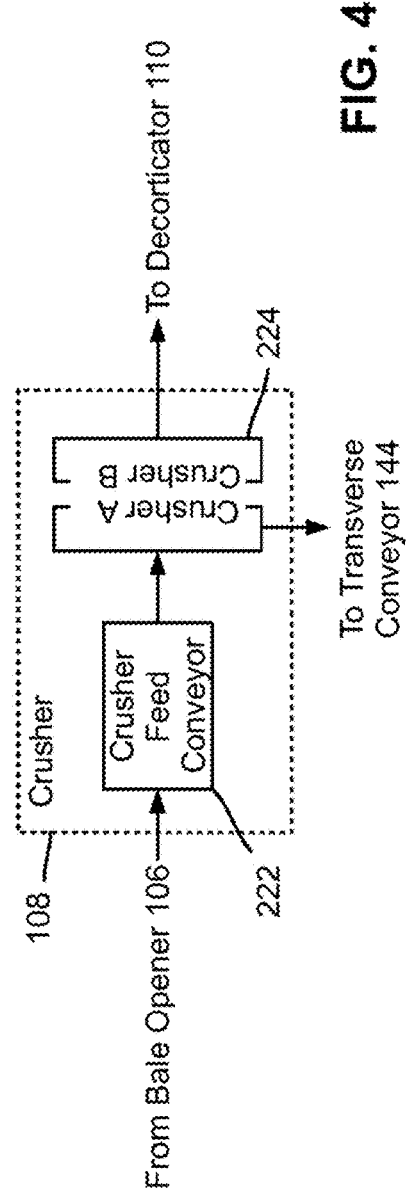
FIG. 4 is a block diagram showing the structure of a crusher of the plant-processing system shown in FIG. 2.

FIG. 4 shows the details of the crusher 108. As shown, the crusher 108 in these embodiments comprises a crusher feed conveyor 222 for receiving crushed plant stalks from the bale opener 106 and conveying the received plant stalks to a pair of crusher rollers 224 (denoted as crusher A and crusher B in FIG. 4) for crushing the plant stalks and outputting the crushed plant stalks to the decorticator 110.

Figure 5:
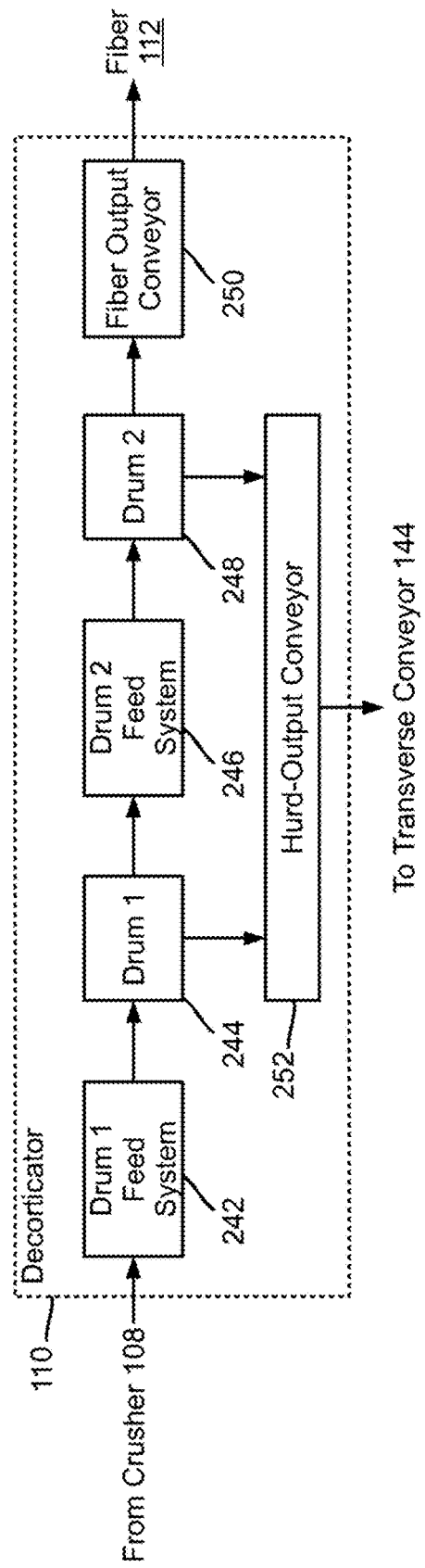
FIG. 5 is a block diagram showing the structure of a decorticator of the plant-processing system shown in FIG. 2.

FIG. 5 shows the details of the decorticator 110. As shown, the decorticator 110 in these embodiments comprises a pair of rotatable drums 244 and 248 (denoted as drum 1 and drum 2 in FIG. 5). A first drum-feed system 242 (denoted as drum 1 feed system in FIG. 5) receives the crushed plant stalks from the crusher 108 and conveys the received plant stalks to the first drum 244. The first drum 244 separates bast fibers from the received plant stalks and outputs separated bast fibers to a second drum-feed system 246 (denoted as drum 2 feed system in FIG. 5). The rest of the plant stalks (comprising hurds and micro-biomass) are fed from the first drum 244 to a hurd-output conveyor 252.

As those skilled in the art will appreciate, the bast fibers output from the first drum 244 may still comprise some hurds and micro-biomass. The second drum-feed system 246 conveys the bast fibers (with some hurds and micro-biomass) from the first drum 244 to the second drum 248 which further separates the bast fibers from the hurds and micro-biomass and outputs the separated bast fibers to a fiber-output conveyor 250 for outputting the bast fibers 112. The second drum 248 also outputs the separated hurds and micro-biomass to the hurd-output conveyor 252.

The hurd-output conveyor 252 collects hurds and micro-biomass from the first and second drums 244 and 248 and conveys the collected hurd-output conveyor 252 to the transverse conveyor 144.

Figure 6:
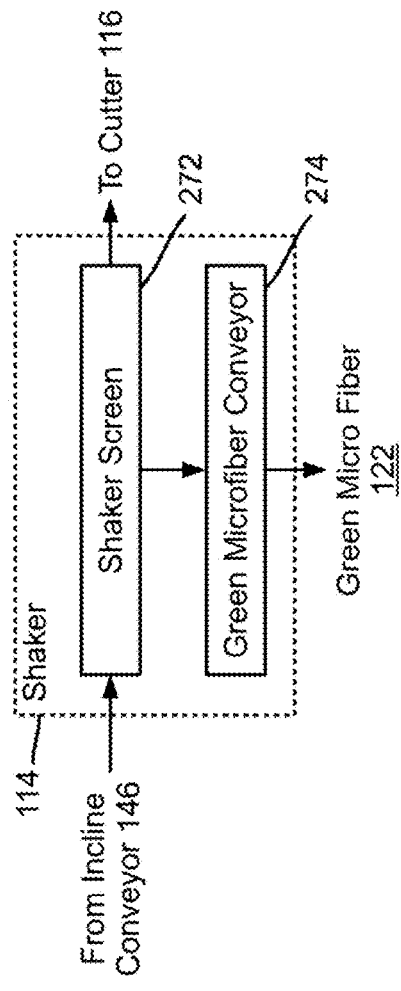
FIG. 6 is a block diagram showing the structure of a shaker of the plant-processing system shown in FIG. 2.

FIG. 6 shows the details of the shaker 114. As shown, the shaker 114 in these embodiments is an oscillatory-screen shaker and comprises a shaker screen 272 for receiving the plant material (hurds and micro-biomass) from the inclined conveyor 146 and separate the hurds and micro-biomass based on their sizes. Generally, the small-size micro-biomass passes through the shaker screen 272 and falls to a green microfiber conveyor 274 for outputting as green microfibers 122. The large-size hurds left on the shaker screen 272 are output to the cutter 116. As described above, the rotor 148 of the cutter 116 granulates the received hurds to the selected size (actual sizes thereof may vary within a reasonable range thereabout).

Figure 7:
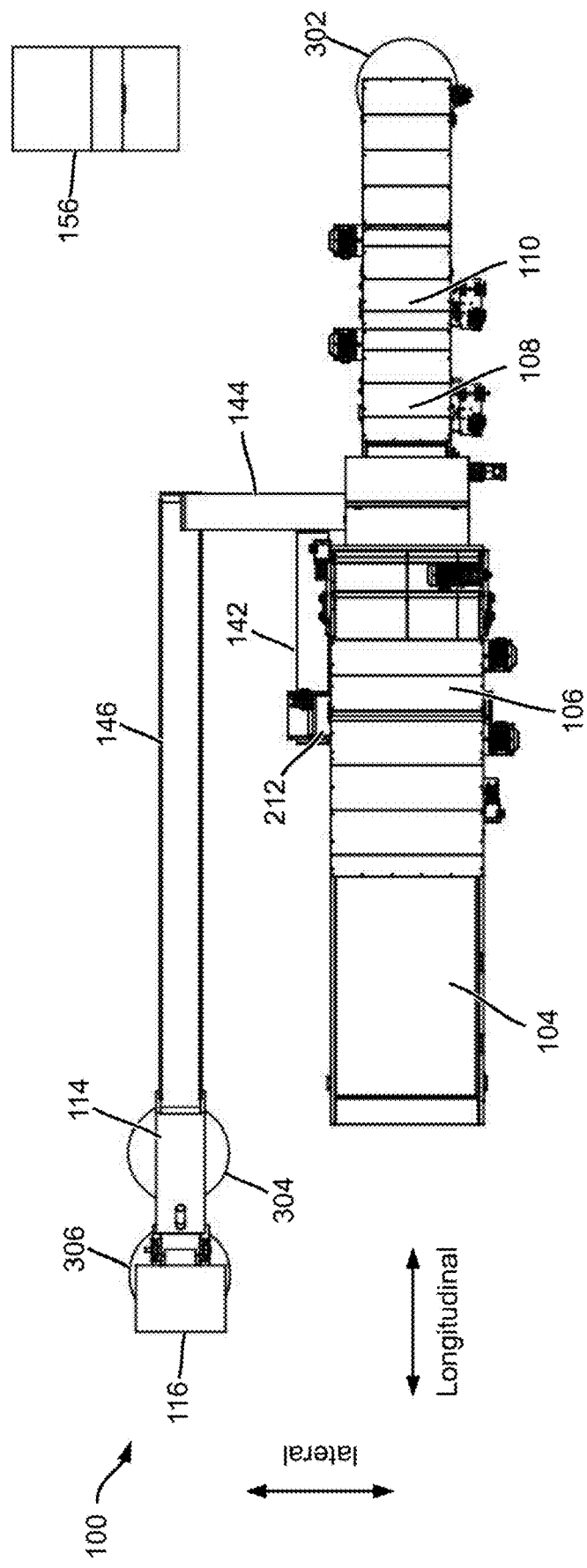
FIG. 7 is a plan view of a plant-processing system, according to some embodiments of this disclosure.
Figure 8:
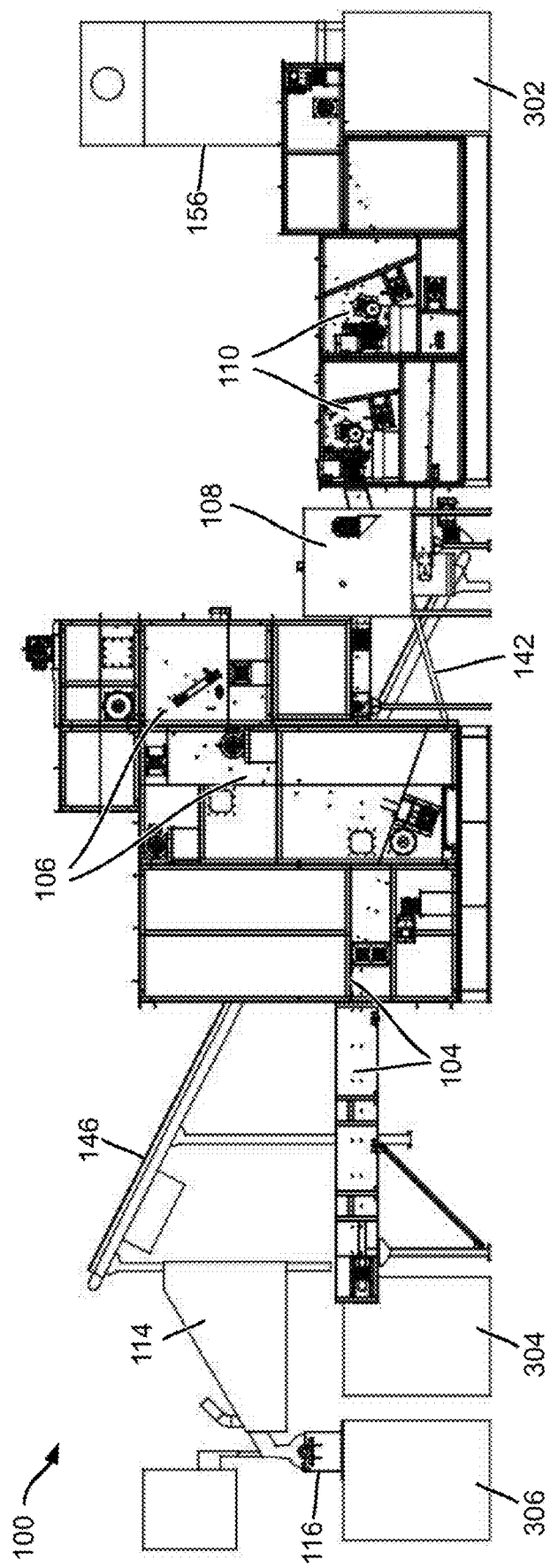
FIG. 8 is a side view of the plant-processing system shown in FIG. 7.
Figure 9:
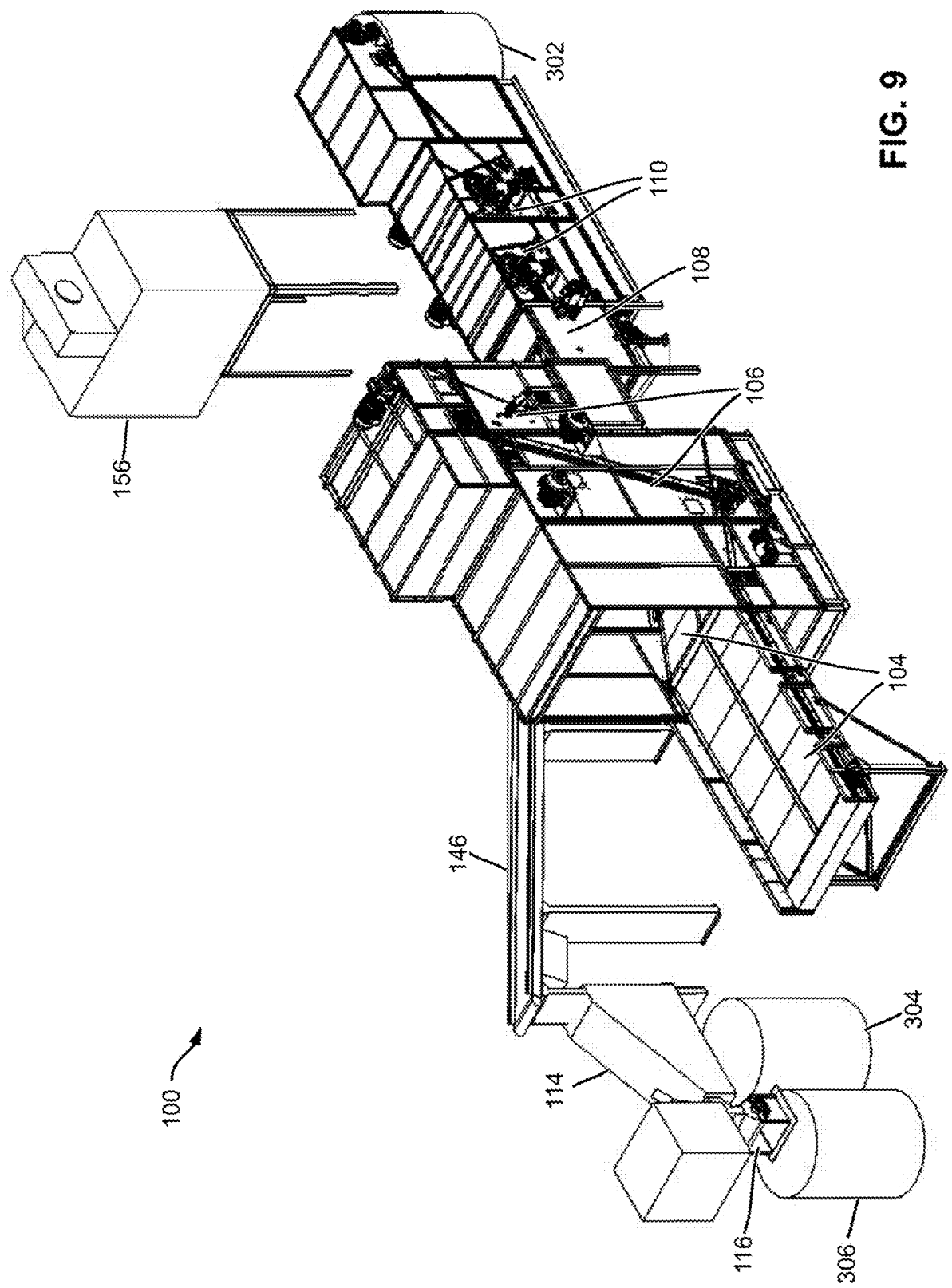
FIG. 9 is a perspective view of the plant-processing system shown in FIG. 7.
Figure 10:
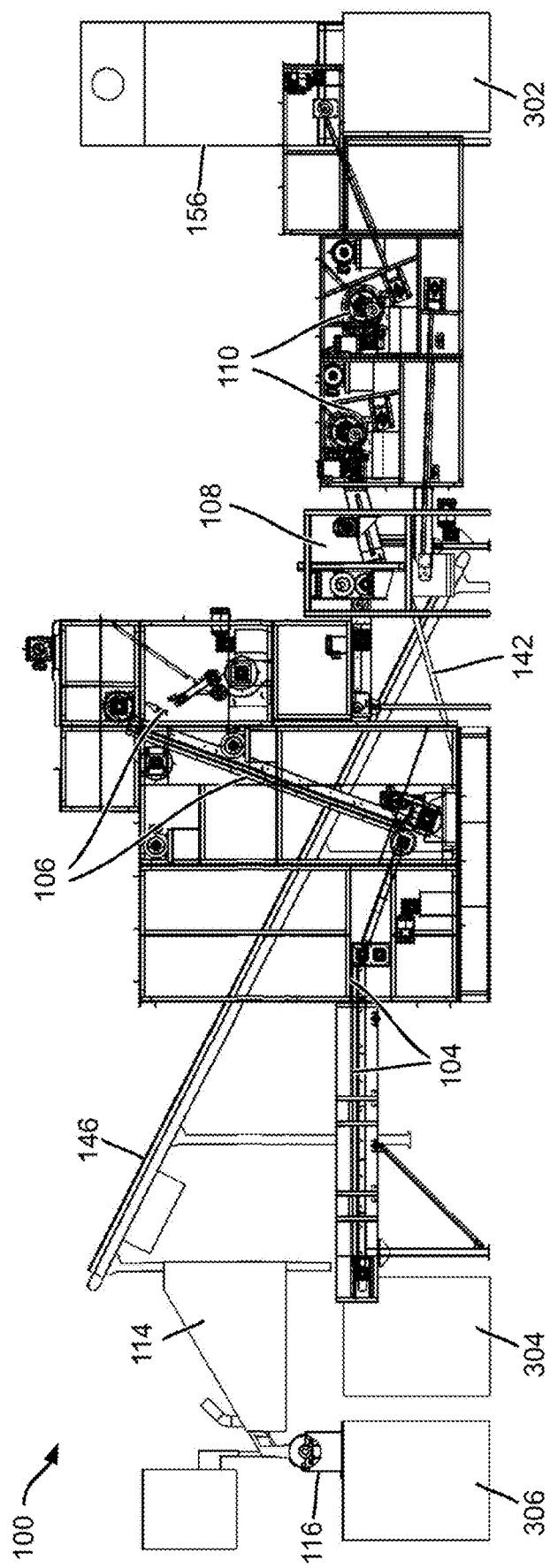
FIG. 10 is a side view of the plant-processing system shown in FIG. 7 with some framing and wall components removed for illustrating the internal structure thereof.
Figure 11:
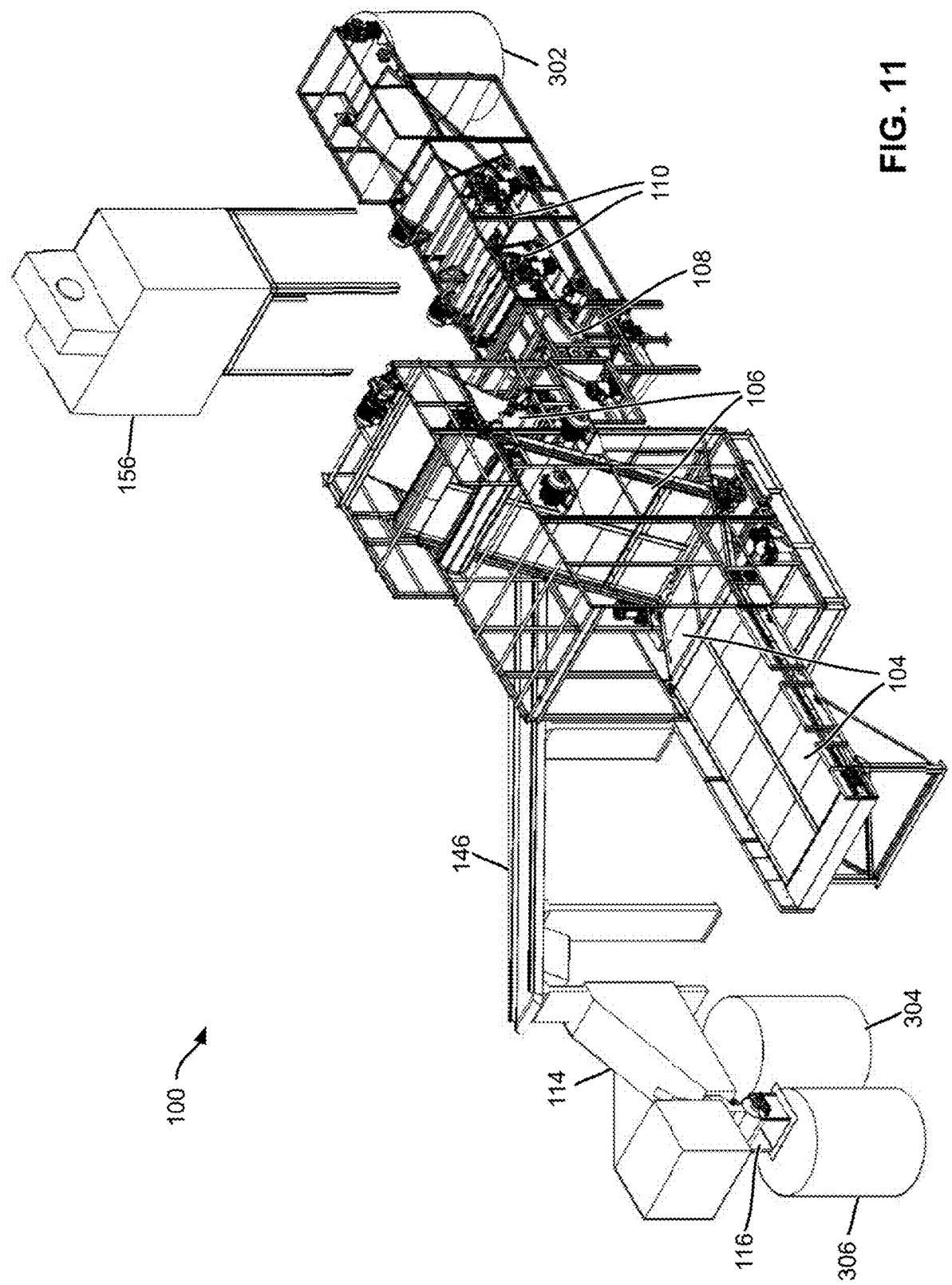
FIG. 11 is a perspective view of the plant-processing system shown in FIG. 7 with some framing and wall components removed.
Figure 12:
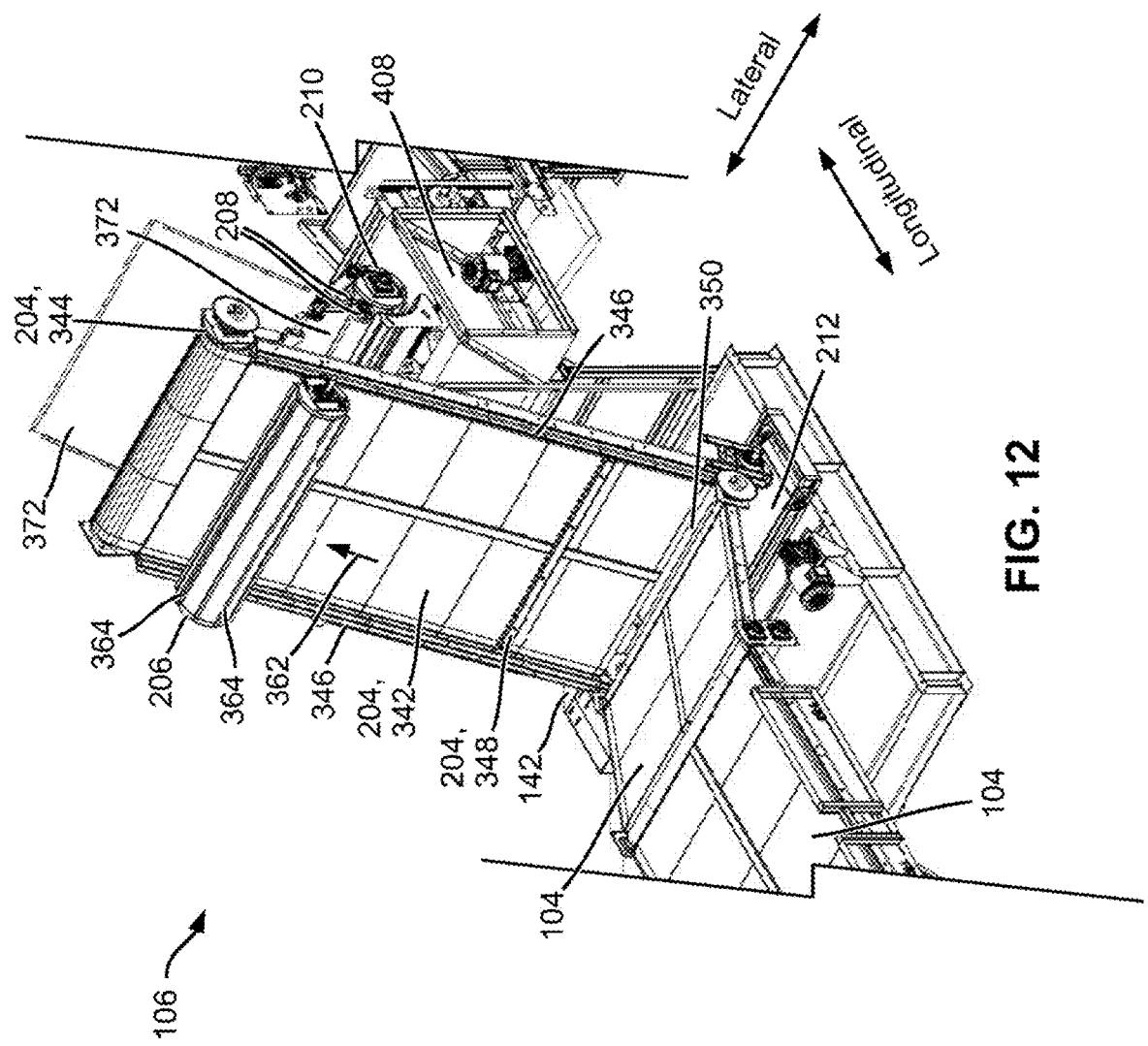
FIG. 12 is a perspective view of a bale opener of the plant-processing system shown in FIG. 7.
Figure 13:
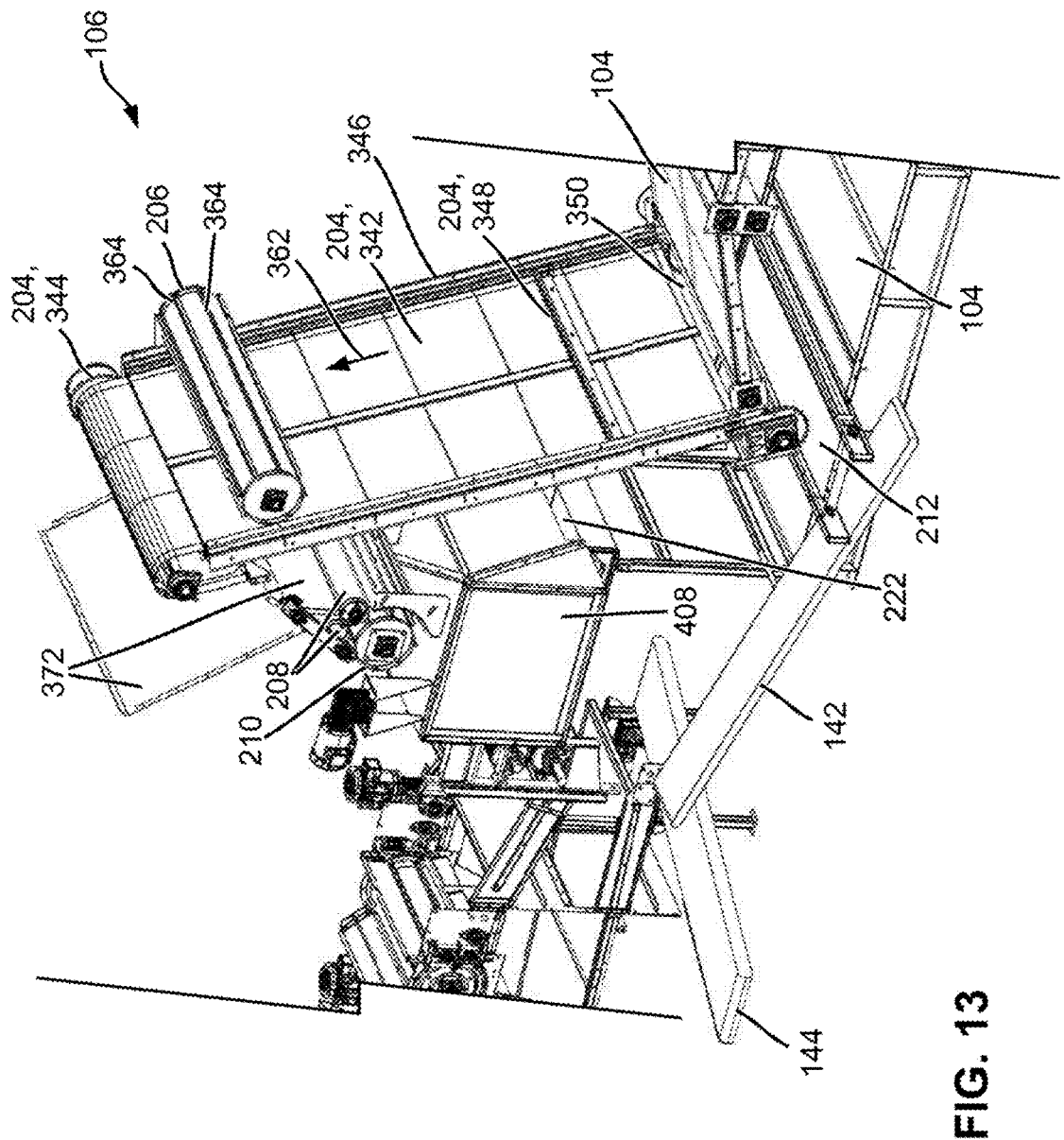
FIGS. 13 and 14 are perspective views of the bale opener shown in FIG. 12, viewed from other viewing angles.
Figure 14:
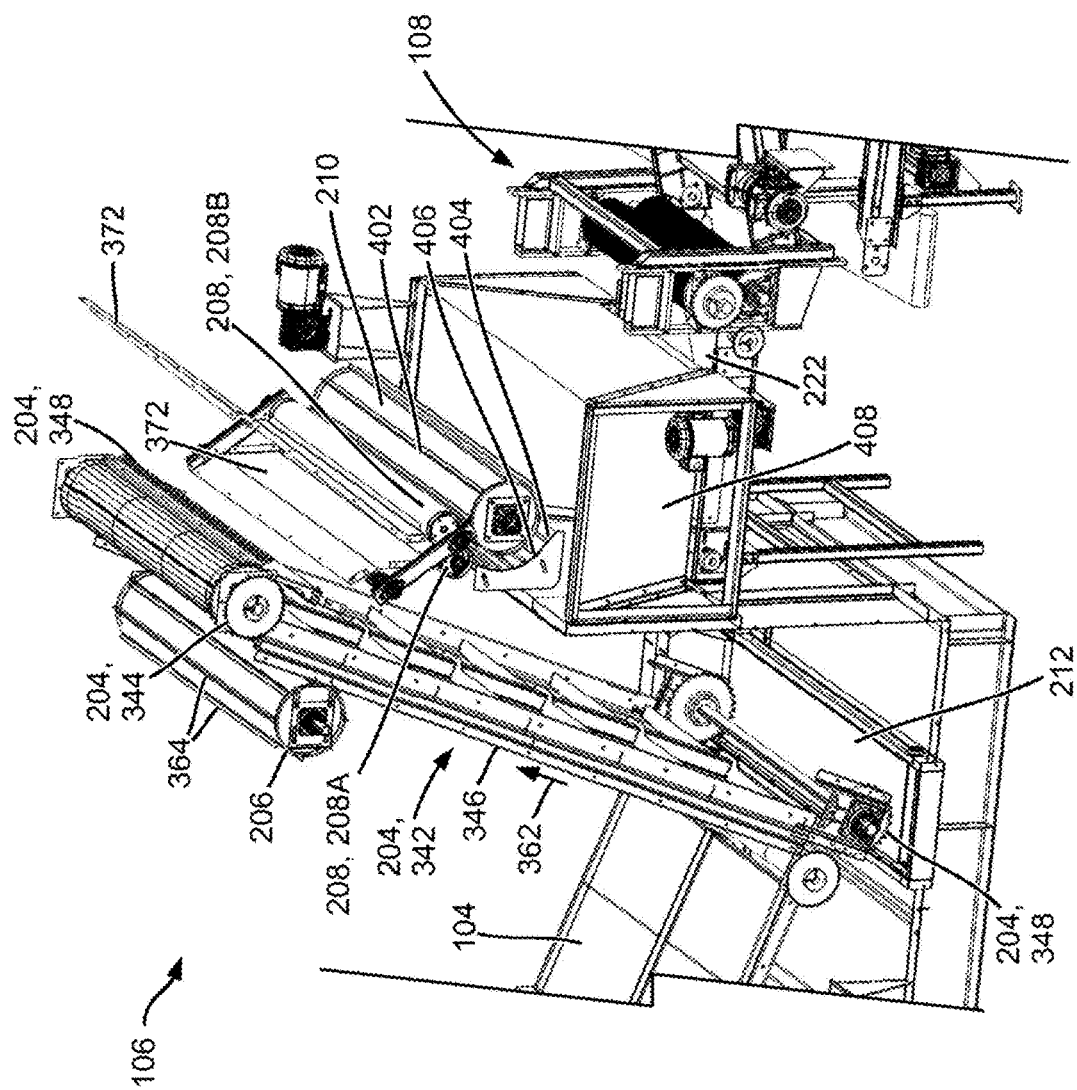
Figure 15:
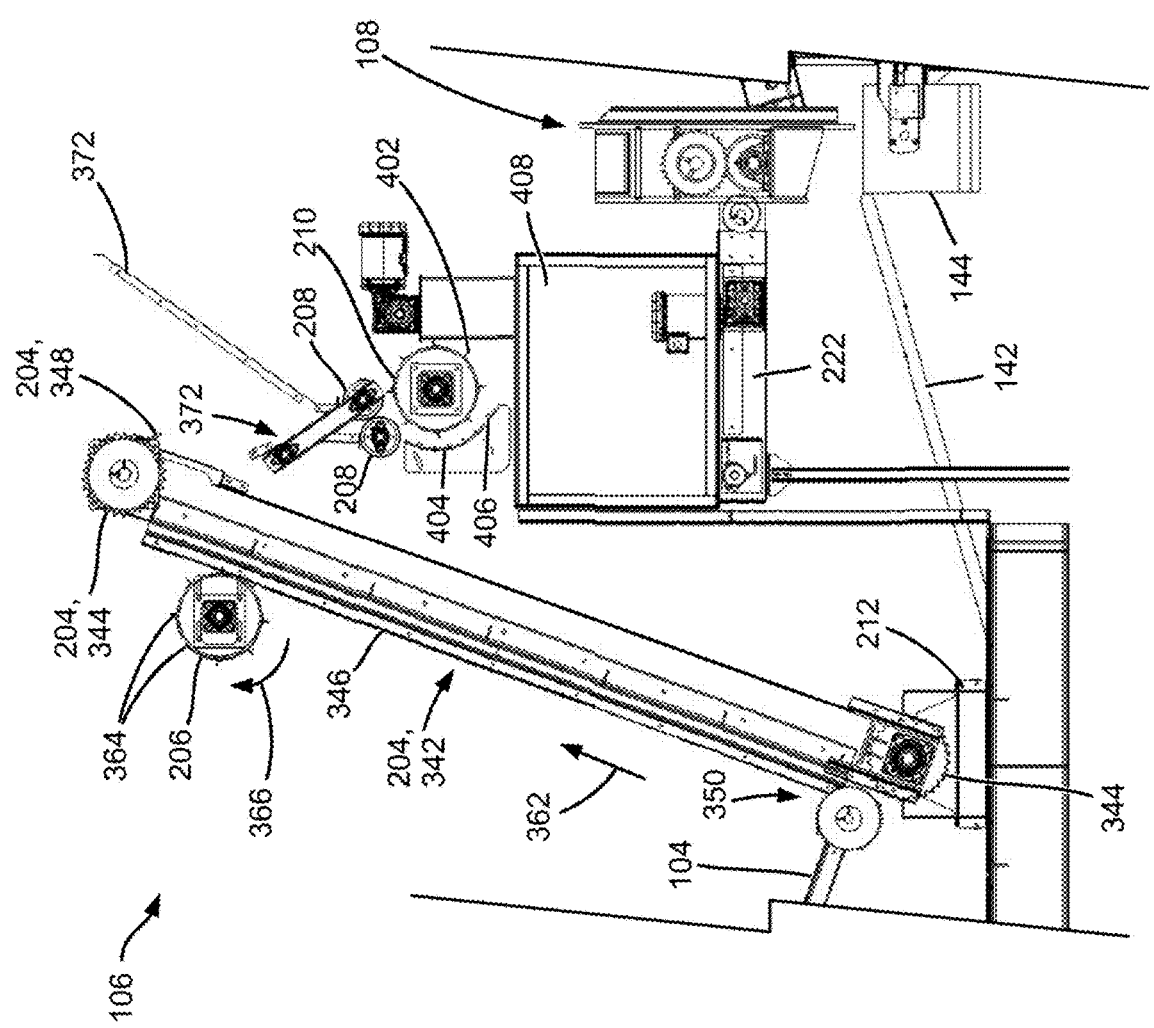
FIG. 15 is a side view of the bale opener shown in FIG. 12.

FIGS. 7 to 9 show a plant-processing system 100 according to some embodiments of this disclosure. FIGS. 10 and 11 are the side view and perspective view of the plant-processing system 100 with some framing and wall components removed for illustrating the internal structure therein.

As shown, the plant-processing system 100 in these embodiments is similar to that shown in FIG. 2 and comprises a bale opener 106, a crusher 108, a decorticator 110, a shaker 114, a cutter 116, and a plurality of conveyors 142, 144, and 146. The plant-processing system 100 also comprises a bast fiber collector 302 (e.g., a bast fiber container) for collecting bast fibers, a green microfiber collector 304 (e.g., a green microfiber container) for collecting green microfibers, and a hurds collector 306 (e.g., a hurds container) for collecting granulated hurds. The plant-processing system 100 further comprises a dust collector 156 for significantly reducing or completely preventing dust generation.

In the following, various components of the plant-processing system 100 are described with reference to relevant drawings. For ease of illustration, some components such as some driving structures (e.g., motors) may be omitted from the drawings.

FIGS. 12 to 15 show the bale opener 106 of the plant-processing system 100. As shown, the bale opener 106 is coupled to the input conveyor 104 for receiving plant bales (not shown) therefrom. The input conveyor 104 comprises an end portion rearwardly and downwardly extending to the bale opener 106 for facilitating the conveying of the plant bales.

In these embodiments, the bale opener 106 comprises a spiked apron 204 formed by an endless belt 342 movable about a pair of sprockets 344 (only a front portion of the endless belt 342 is shown in FIGS. 12 to 15 for ease of illustration). The bale opener 106 comprises a pair of sidewalls 346 about the two lateral sides of the endless belt 342 for preventing the plant stalks from falling therefrom (see FIGS. 7 and 12 for the illustrations of "lateral" and "longitudinal").

The endless belt 342 is arranged in a sloped orientation with a distal end thereof (i.e., the end distant to the input conveyor 104) positioned at a higher elevation than a proximal end thereof (i.e., the end adjacent the input conveyor 104) such that the front side of the endless belt 342 faces front and upward. Moreover, the proximal end of the endless belt 342 is at a distance to the input conveyor 104 thereby forming a gap 350 therebetween. The fine conveyor 212 having an endless belt is located under the gap 350 and functionally coupled to the bypass conveyor 142 (also having an endless belt) for receiving broken stalks falling through the gap 350 and conveying the broken stalks to the bypass conveyor 142.

Figure 16:
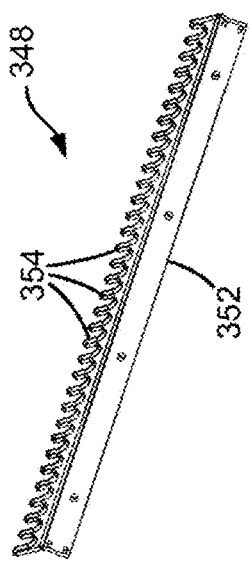
FIG. 16 is a perspective view of a slat of the spiked apron of the bale opener shown in FIG. 12.

As part of the spiked apron 204, one or more slats 348 are coupled to and laterally extending on the endless belt 342 at spaced locations. As shown in FIG. 16, the slat 348 comprises a bar-shaped base 352 for mounting to the endless belt 342 and a plurality of rake-like teeth 354 extending upwardly therefrom.

Referring again to FIGS. 12 to 15, the endless belt 342 may be driven by a motor (not shown) to circularly move about the two sprockets 344 at a direction indicated by the arrow 362 such that the front side of the endless belt 342 and the slats 348 thereon are moving upwardly and rearwardly. When a bale 102 (not shown) is moved to the end of the input conveyor 104 and adjacent the spiked apron 204, the teeth 354 of the slats 348 at the front side of the endless belt 342 grab the plant stalks of the bale and detach or extract clumps of tangled plant stalks therefrom, thereby opening the bale.

The detached clumps of tangled plant stalks are then moved by the endless belt 342 upwardly towards the top of the spiked apron 204. In these embodiments, the bale opener 106 comprises a regulating drum 206 adjacent the spiked apron 204 about an upper portion thereof and having a plurality of laterally extending drum-flanges or blades 364 circumferentially distributed thereon and spaced from each other. The regulating drum 206 is rotatable along a direction indicated by the arrow 366 (see FIG. 15) such that the portion thereof adjacent the spiked apron 204 moves in a opposite direction to the moving direction of the spiked apron 204 for regulating the detached clumps of tangled plant stalks on the endless belt 342 and facilitating the endless belt 342 to lift the plant stalks towards the top of the spiked apron 204.

When the plant stalks move to the top of the spiked apron 204, the plant stalks fall off from the spiked apron 204 to a rear side thereof. The bale opener 106 comprises a pair of pre-opener chutes 372 for receiving the falling plant stalks and guiding the plant stalks through a pair of laterally extending pre-opener feed rollers 208A and 208B (collectively identified using reference numeral 208) thereunder.

Figure 17:
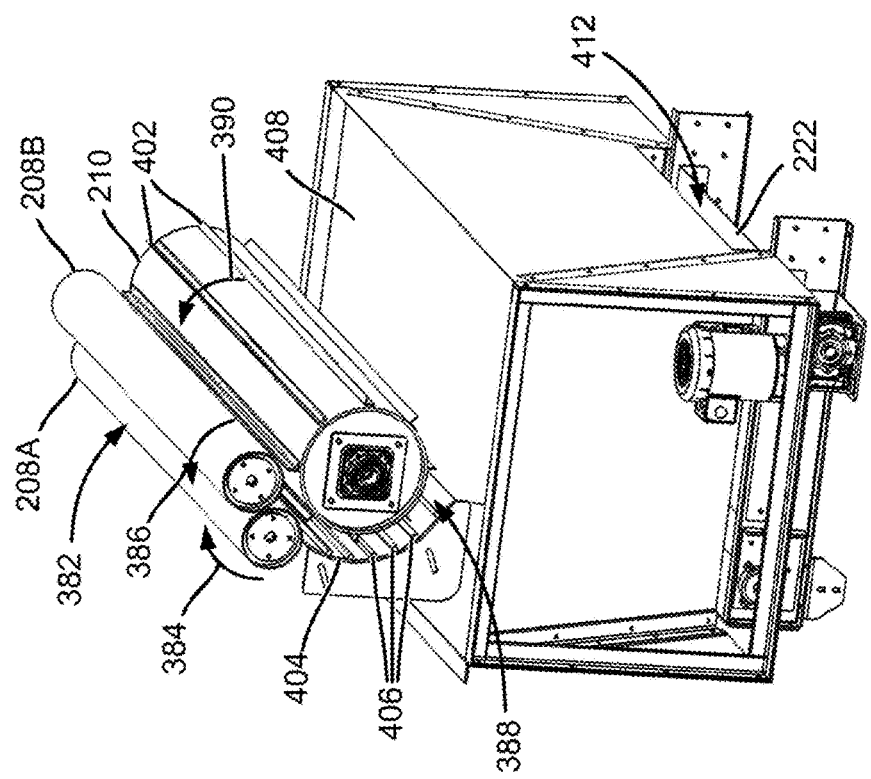
FIG. 17 is a perspective view of a portion of the bale opener shown in FIG. 12, showing a pair of pre-opener feed rollers, a rotatable pre-opener drum, and a frustum-shaped guide thereof.

As shown in FIG. 17, the pair of laterally extending pre-opener feed rollers 208A and 208B are arranged with a gap 382 therebetween. The distal roller 208B (i.e., the roller distant to the endless belt 342) is at an elevation slightly higher than that of the proximal roller 208A (i.e., the roller adjacent the endless belt 342) such that the gap 382 is substantially open to above for receiving the tangled plant stalks falling from thereabove. The rollers 208 are rotatable in opposite directions as indicated by the arrows 384 and 386, i.e., the adjacent portions of the two rollers 208 moving downwardly, for driving the plant stalks to move downwardly therethrough.

The pre-opener drum 210 is located under the rollers 208 and spaced from a drum base 404 to form a gap 388 therebetween in communication with the gap 382 for receiving the plant stalks falling from the rollers 208. The pre-opener drum 210 is similar to the regulating drum 206 and has a plurality of laterally extending drum-flanges or blades 402 circumferentially distributed thereon and spaced from each other. The pre-opener drum 210 is rotatable in a direction as indicated by the arrow 390 for disentangling the plant stalks and facilitating the plant stalks to move downwardly in the gap 388.

The drum base 404 "shadows" the drum 210 and has an arc-shaped inner surface concentric to the drum 210. The drum base 404 also comprises a plurality of laterally extending ridges 406 spaced from each other and circumferentially distributed on the inner surface. Each ridge 406 has a height of about 0.5" (inch) to about 1" and is spaced from the adjacent ridge for about 2" to about 4". The gap 388 measured from the "top" or distal end of the ridge 406 to the "top" or distal end of the blade 402 of the drum is regulated within the range of about 2" to about 6" for accommodating various types of plant stalks.

As described above, the detached clumps of tangled plant stalks are conveyed by the endless belt 342 to the upper end thereof and fall through the chutes 372 into the gap 382 between the rotating rollers 208. The rotating rollers 208 further regulate the plant stalks and then the plant stalks fall into the gap 388 between the rotating drum 210 and the drum base 404.

The blades 402 of the rotating drum 210 grab the clumps of tangled plant stalks and whirl them in a whipping action (also referred to as "kinematically inverted whipping") against the drum base 404 and the ridges 406 thereon to separate the tangled stalks. The separated plant stalks then fall off the gap 388 and travel through a frustum-shaped guide 408 on to the crusher feed conveyor 222 thereunder for outputting the separated plant stalks through an opening 412 on a rear side of the guide 408 and conveying them to the crusher 108.

Figure 18:
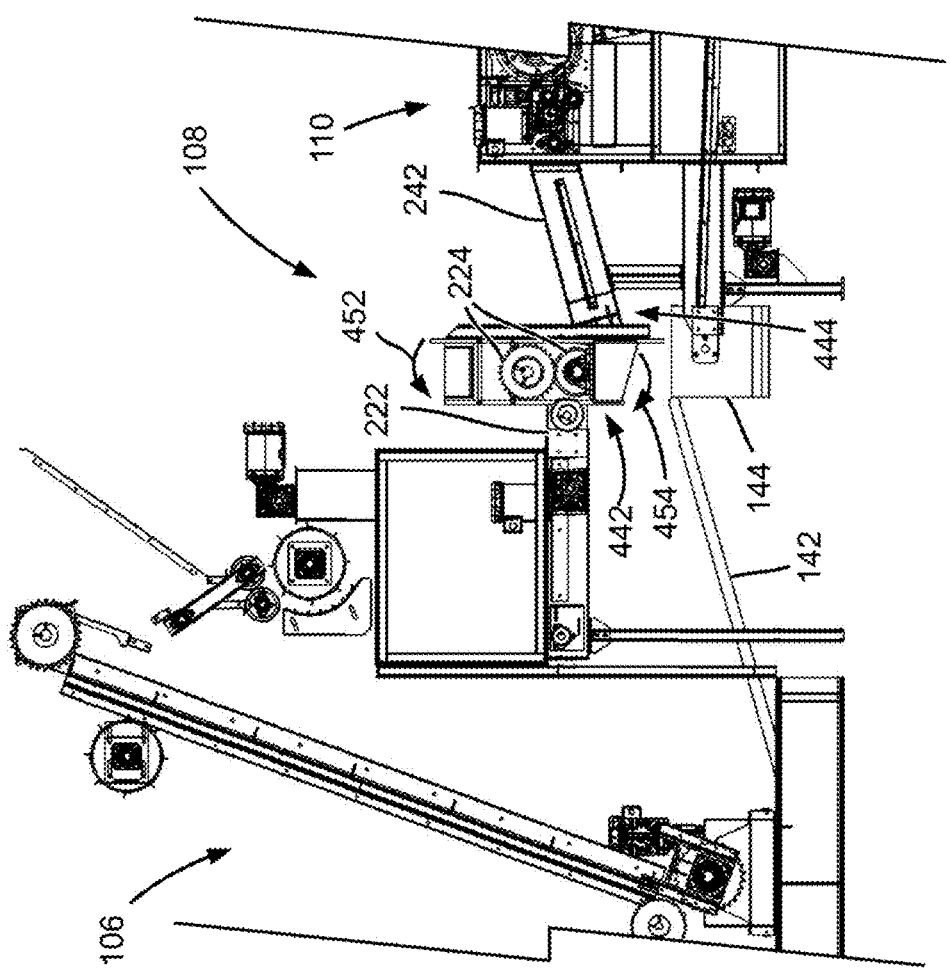
FIG. 18 is a side view of a crusher of the plant-processing system shown in FIG. 7.

FIG. 18 is a side view of the crusher 108. As shown, the crusher 108 comprises a pair of crusher rollers 224 and a feed conveyor 222 in the form of a conveyor belt extending from the crusher rollers 224 into the bale opener 106 under the frustum-shaped guide 408 for conveying the plant stalks to the pair of crusher rollers 224. At the output side, the crusher rollers 224 is adjacent the first drum-feed system 242 of the decorticator 110.

The crusher 108 also comprises a gap 442 between the feed conveyor 222 and the crusher rollers 224 and/or a gap 444 between the crusher rollers 224 and the first drum-feed system 242 of the decorticator 110 for allowing hurds and micro-biomass to fall onto the transverse conveyor 144 under the crusher 108.

Figure 19:
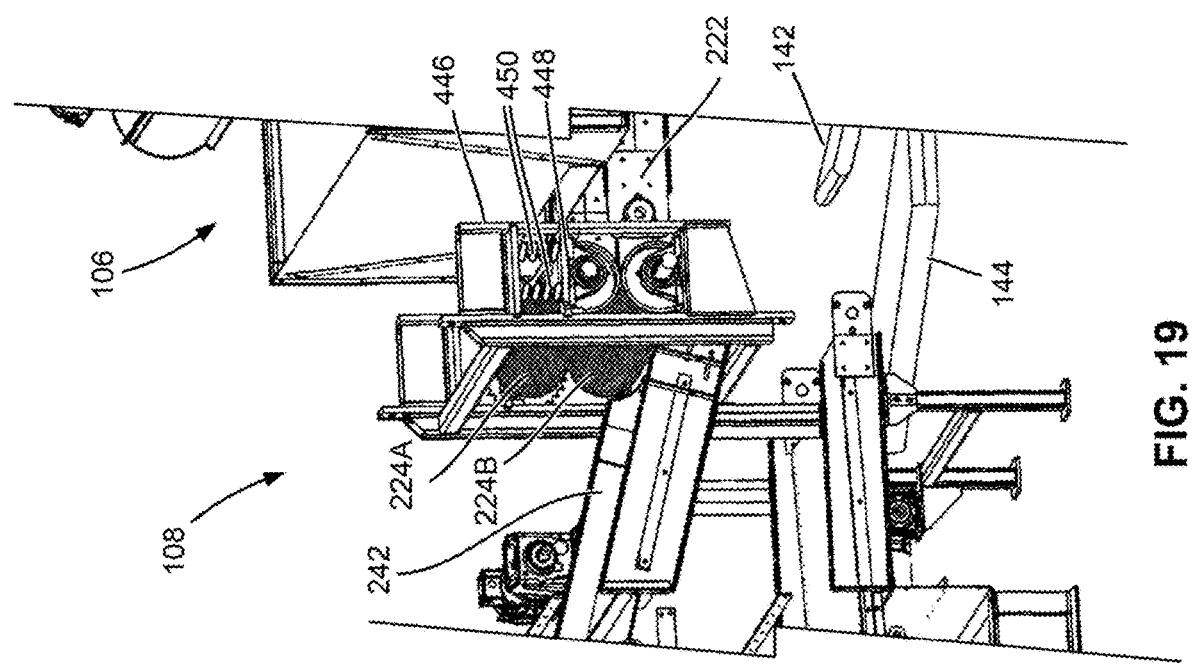
FIG. 19 is a perspective view of the crusher shown in FIG. 18.

As shown in FIG. 19, the crusher rollers 224 are mounted on a frame 446. In particular, the lower roller 224B is mounted on a fixed position of the frame 446 and the upper roller 224A is mounted on a vertically movable bar 448 biased by a biasing structure 450 such as one or more springs such that when crushing the plant stalks, the upper roller 224A may be pushed upwardly by the plant stalks passing through the gap between the rollers 224 while the springs 450 maintain a downward pressure sufficient for crushing the plant stalks without damaging the bast fibers thereof.

Figure 20:
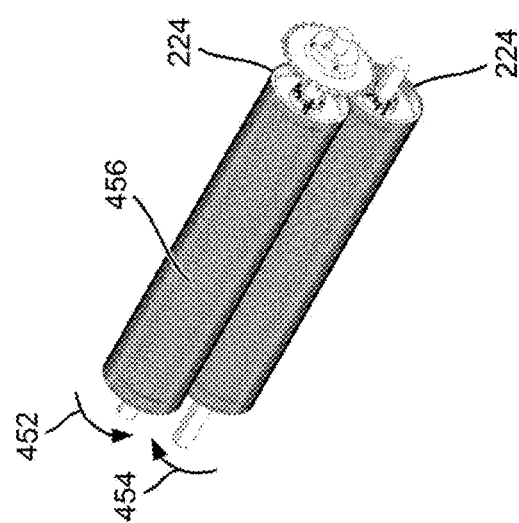
FIG. 20 is a perspective view of a pair of crusher rollers of the crusher shown in FIG. 18.

The crusher rollers 224 are rotatable in opposite directions as indicated by the arrows 452 and 454, i.e., the adjacent portions of the two crusher rollers 224 moving rearwardly, for crushing the plant stalks and driving the crushed stalks towards the first drum-feed system 242 of the decorticator 110. As shown in FIG. 20, each crusher roller 224 comprises a plurality of laterally extending ridges 456 distributed on the outer surface thereof for crushing the plant stalks.

Figure 21:
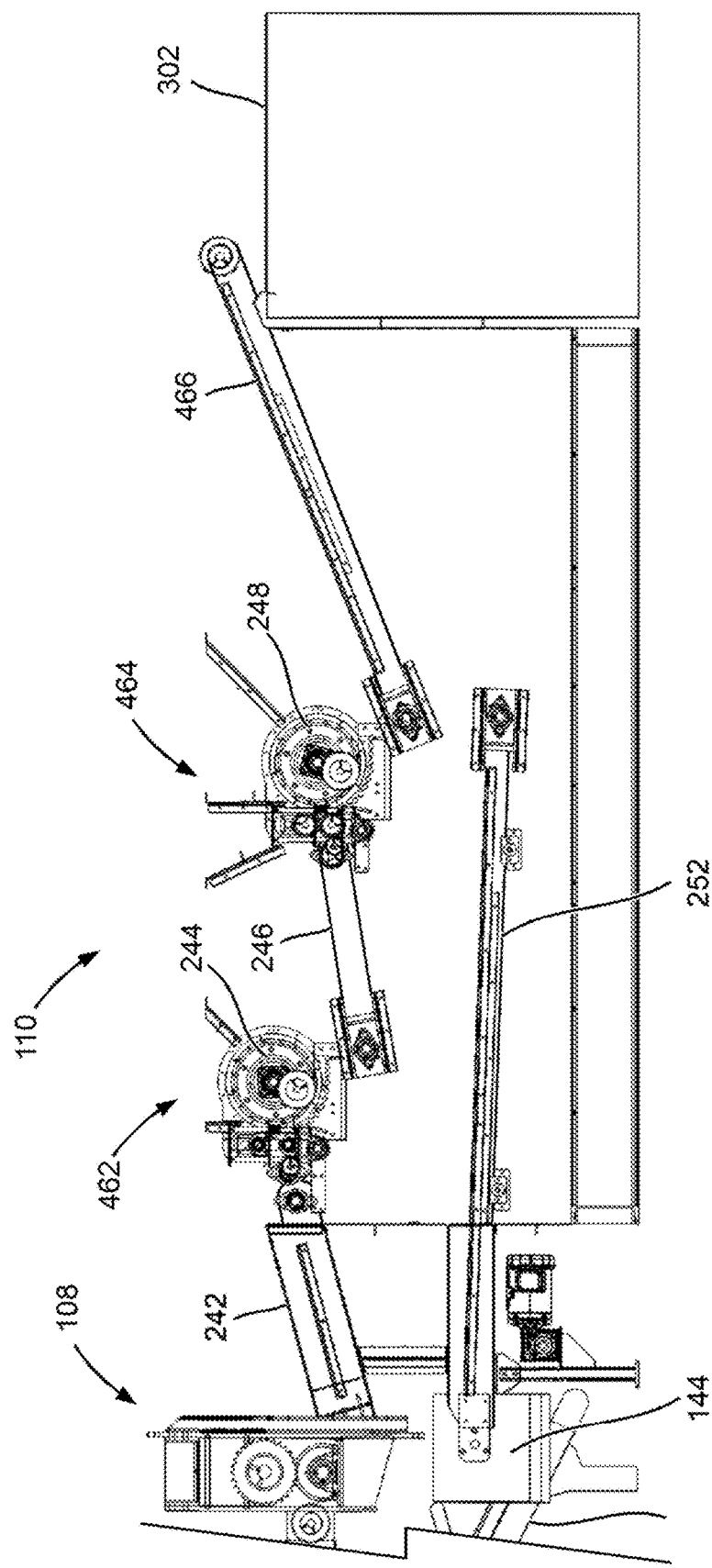
FIG. 21 is a side view of a decorticator of the plant-processing system shown in FIG. 7, the decorticator having two drum assemblies.
Figure 23:
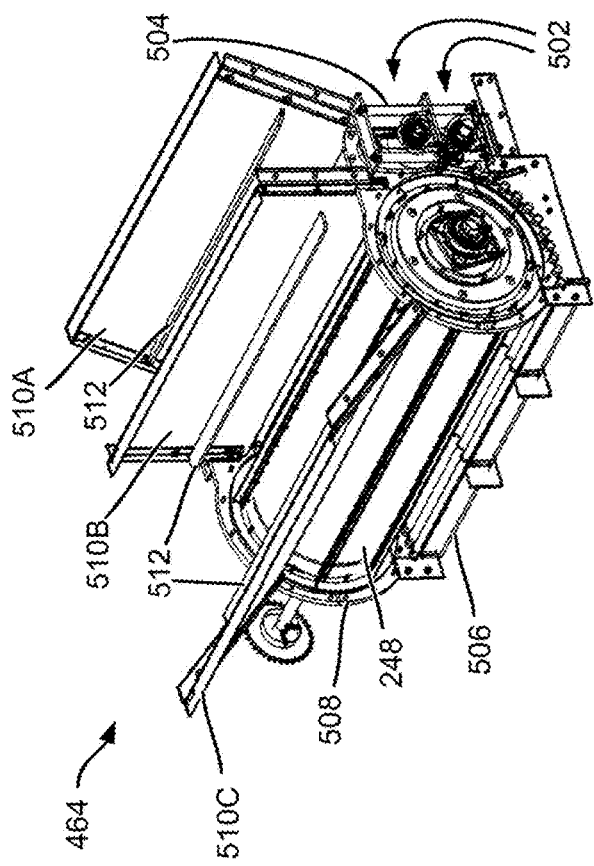
FIGS. 22 and 23 are perspective views of the second drum assembly of the decorticator shown in FIG. 21, viewed from different viewing angles.

FIG. 21 is a side view of the decorticator 110 of the plant-processing system 100. As shown, the decorticator 110 comprises a first drum-feed system 242 in the form of an endless belt, a first drum assembly 462, a second drum-feed system 246 in the form of an endless belt, and a second drum assembly 464 functionally consecutively coupled to each other. An inclined fiber-output conveyor 466 extends rearwardly and upwardly from the second drum assembly 464 to the fiber collector 302.

In these embodiments, the decorticator 110 also comprises a hurd-output conveyor 252 located under the components 242 to 248 and extending from the second drum assembly 464 forwardly to the transverse conveyor 144.

The first and second drum-feed systems 242 and 246 are similar to each other and each comprises an endless conveyor belt.

Figure 22:
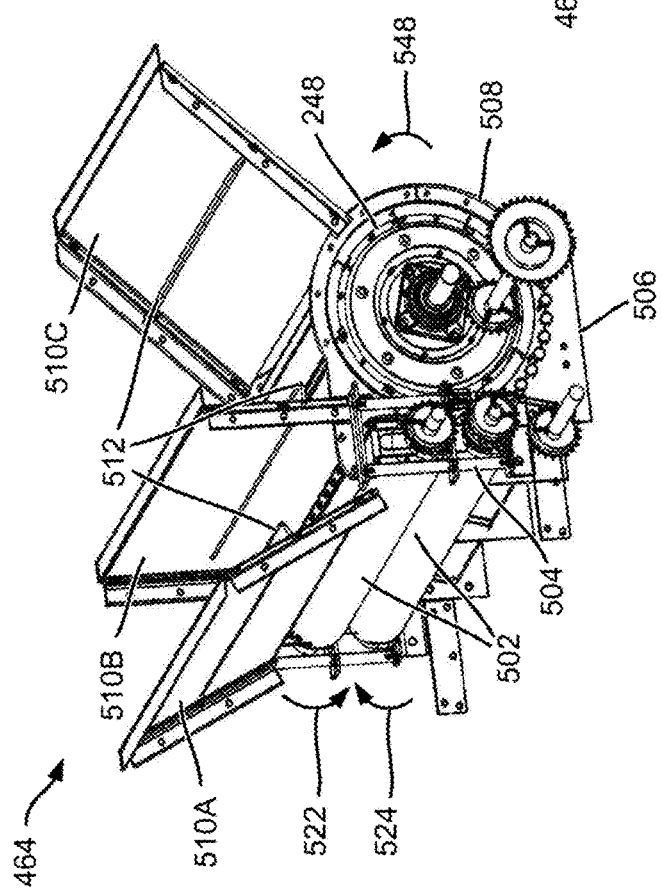

FIG. 22 is a perspective view of the second drum assembly 464. As shown, the drum assembly 464 comprises a pair of low-speed decorticator rollers 502 rotatably mounted on a roller frame 504, a drum base 506 at a rear side of the decorticator rollers 502, a high-speed decorticator drum 248 rotatably mounted on a drum frame 508 about the drum base 506, and a plurality of baffles 510 including a front baffle 510A extending forwardly and upwardly from the roller frame 504, a middle baffle 510B extending substantively upwardly from the roller frame 504, and a rear baffle 510C extending rearwardly and upwardly from the drum frame 508. Each baffle 510 comprises a lateral bar 512 extending therefrom.

In operation, the decorticator rollers 502 rotate at a low speed for feeding a thick layer of disrupted plant stalks to the decorticator drum 248 and drum base 506. The decorticator drum 248 rotates at a high speed such as between about 800 to about 1600 RPM for separating the bast fibers from the disrupted plant stalks. In these embodiments, the ratio of the RPM-speed of the decorticator rollers 502 to that of the decorticator drum 248 is between 1:10 and 1:50.

Figure 24:
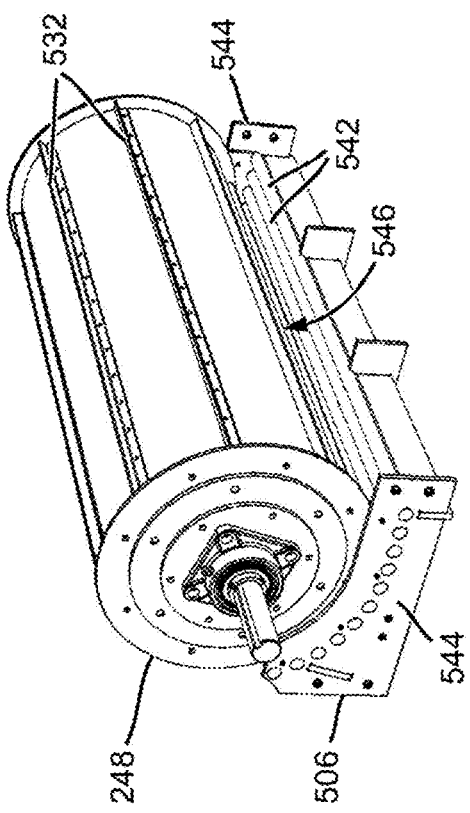
FIG. 24 is a perspective view of a decorticator drum and a drum base of the second drum assembly shown in FIG. 22.

FIG. 24 is a perspective view of the second drum assembly 464 only showing the decorticator drum 248 and the drum base 506. As can be seen, the decorticator drum 248 and the drum base 506 are similar to the pre-opener drum 210 and the drum base 404 of the bale opener 106, respectively (see FIG. 17).

In particular, the decorticator drum 248 has a diameter of about 8" to 24" and comprises a plurality of laterally extending blades 532 circumferentially distributed on the outer surface thereof. Each blade has a height of about 0.5" to about 1.5" with dull or rounded edges. In some embodiments, the decorticator drum 248 comprises at least two blades 532. In some embodiments, the maximum number of blades 532 on the decorticator drum 248 may be determined by a minimum blade spacing such as about 3" to about 6".

Figure 25:
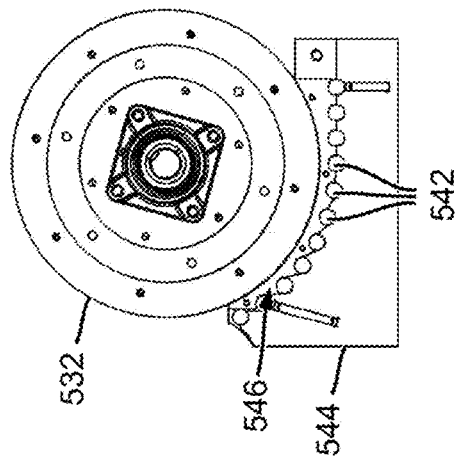
FIG. 25 is a side view of the decorticator drum and the drum base of FIG. 24 with a sidewall of the drum base removed.
Figure 26:
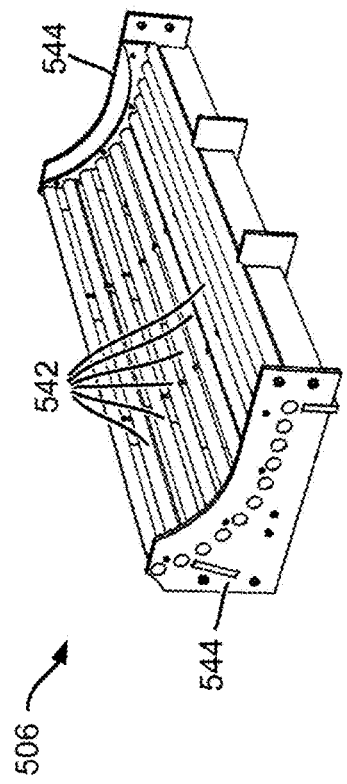
FIG. 26 is a perspective view of the drum base of the second drum assembly shown in FIG. 22.

As shown in FIGS. 24 to 26, the drum base 506 comprises a plurality of rods 542 laterally extending between opposite sidewalls 544. The rods 542 are spaced from each other and are arranged in an arc manner about the decorticator drum 248. As shown in FIG. 25, when assembled, the decorticator drum 248 is spaced from the drum base 506 thereby forming a gap 546 therebetween which is substantively smaller compared to the gap 388 between the pre-opener drum 210 and the drum base 404 of the bale opener 106 (see FIG. 17).

The first drum assembly 462 is similar to the second drum assembly 464 except that the first drum assembly 462 does not comprise a front baffle 510A.

Referring again to FIG. 21, as described above, the crusher 108 crushes the plant stalks and outputs the crushed plant stalks to the first drum-feed system 242 which in turn conveys the crushed plant stalks to the two high-speed rollers 502 of the first drum assembly 462. As shown in FIG. 22, the two high-speed rollers 502 rotate along opposite directions as indicated by the arrows 522 and 524, i.e., the adjacent portions of the two rollers 502 moving rearwardly, to drive the plant stalks rearwardly through the gap therebetween.

After passing the two high-speed rollers 502, the plant stalks enter the gap 546 between the decorticator drum 248 and the drum base 506. The decorticator drum 248 rotates in a direction as indicated by the arrow 548 shown in FIG. 22, i.e., the lower portion thereof moving rearwardly. Therefore, the blades 532 of the decorticator drum 248 grab the plant stalks, whip the plant stalks against the rods 542 of the drum base 506 while pulling them through the gap 546. Such a whipping action may be referred to as "kinematically inverted whipping".

Consequently, the plant stalks are split and the hurds thereof are whipped out by centrifugal force. The bast fibers and hurds of the plant stalks are then separated and most of the hurds and micro-biomass fall through the space between the rods 542 of the drum base 506 onto the hurd-output conveyor 252 for conveying to the transverse conveyor 144. The blades 532 of the decorticator drum 248 grab the bast fibers, pull them through the gap 546, and output them to the second drum-feed system 246 at the rear side thereof. In these embodiments, the speed of the second drum-feed system 246, or more specifically the speed of the conveyor belt of the second drum-feed system 246, is no higher than 10% of the linear speed of the drum surface of the first or second decorticator drums 244 or 248 (the drums 244 and 248 have the same speed in these embodiments).

During operation, the plurality of baffles 510 prevent the plant stalks and separated bast fibers and hurds from being thrown out of the decorticator 110 by the high-speed rollers 502 and the decorticator drum 248.

As those skilled in the art will appreciate, the output of the first drum assembly 462 may comprise, in addition to the bast fibers, some partially-split plant stalks and a small amount of hurds and micro-biomass. For improving the plant decortication performance, the output of the first drum assembly 462 is conveyed by the second drum-feed system 246 to the second drum assembly 464 which repeats the above described plant decertification process. Bast fibers are then output to the bast fiber collector 302 via the fiber-output conveyor 466 and the hurds and micro-biomass fall onto the hurd-output conveyor 252 for conveying to the transverse conveyor 144.

Referring again to FIG. 7, the transverse conveyor 144 collects hurds and micro-biomass from the bale opener 106 (via the fine conveyor 212 and the bypass conveyor 142), the crusher 108, and the decorticator 110 (via the hurd-output conveyor 252) and conveys the collected hurds and micro-biomass to an inclined conveyor 146 (see FIG. 8) which lifts the hurds and micro-biomass to a higher elevation and drops them off to a shaker 114 for separating the hurds and micro-biomass.

Figure 27B:
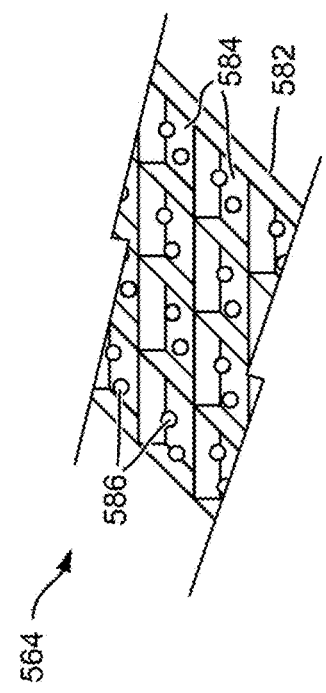
FIG. 27B is a perspective view of a portion of a screen assembly of the shaker shown in FIG. 27A.
Figure 27A:
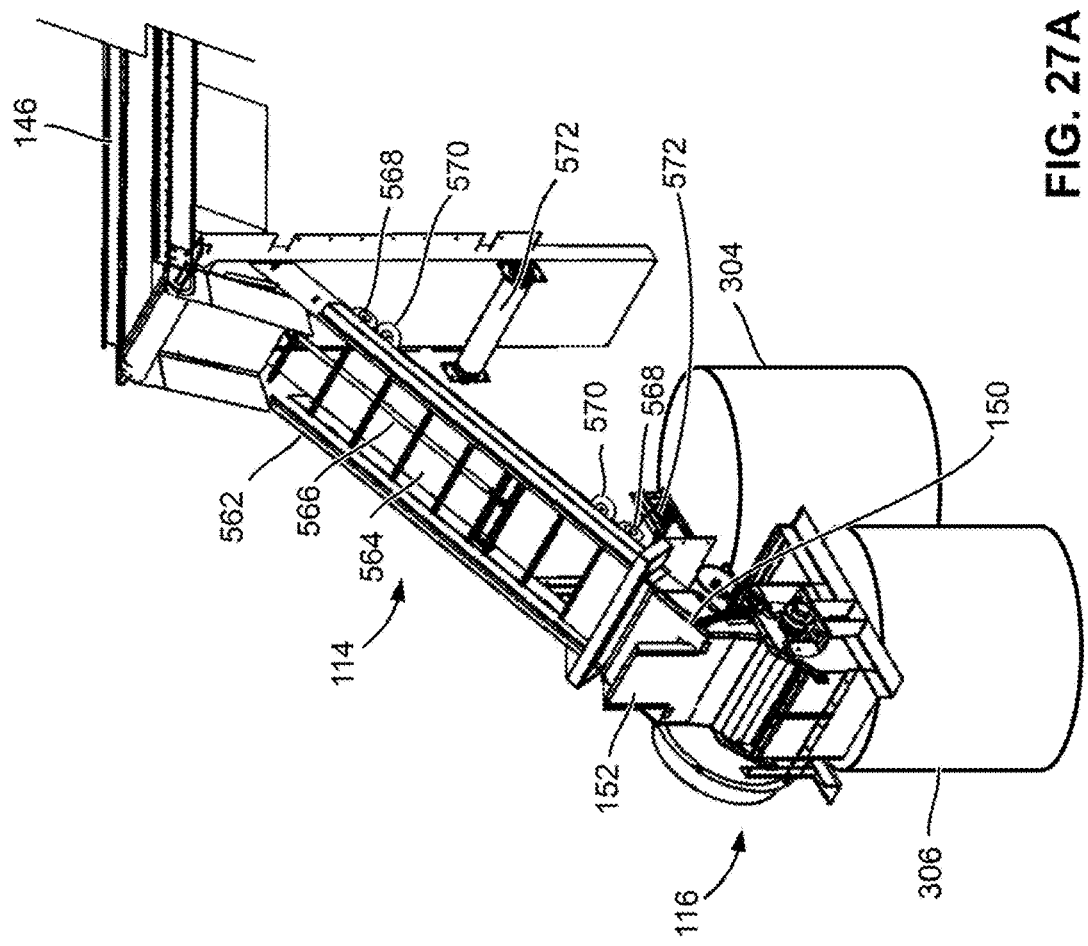
FIG. 27A is a perspective view of a shaker of the plant-processing system shown in FIG. 7.

As shown in FIG. 27A, the shaker 114 comprises an inclined channel or conveyor 562 extending downwardly at a predefined, relatively steep angle to a cutter 116. The channel 562 comprises a screen assembly 564 as an inclined bottom wall thereof for screening the micro-biomass from the input plant material (comprising bast fibers, hurds, and micro-biomass).

In these embodiments, the screen assembly 564 has a double-layer structure having a box-like bottom screen layer and a top screen layer. As shown in FIG. 27B, the screen comprises a box-like bottom layer 582 having a bottom wall made of a screen and a top layer (not shown) made of a screen and covered to the bottom layer 582.

The bottom layer 584 is partitioned into a plurality of cells 584 of a predefined size and a predefined height. Each cell 584 receives therein a plurality of rubber balls 586 movable therein. For example, in these embodiments, each cell 584 has a dimension of about 8" by 8" with a height of about 2". Each cell 584 movably receives therein 2 to 4 rubber balls each having a diameter of about 1" to about 1.5".

In these embodiments, the shaker also comprises a shaking structure for shaking the channel 562 and thus the screen assembly 564 thereof to facilitate the screening of the micro-biomass. The shaking structure comprises a shaker rod 566 for axially shaking the channel 562, one or more horizontal shaker wheels 568 for horizontally shaking the channel 562, and one or more vertical shaker wheels 570 for vertically shaking the channel 562.

During the shaking operation, the balls 586 are bouncing in the cells 584 of the double-layer screen assembly 564, thereby cleaning the screens of the top and bottom layers and preventing the screens from potential blockage by micro-biomass.

The screened-out micro-biomass falls onto a conveyor belt (not shown) under the channel 562 and rotatable between the pulleys 572 for conveying to the green micro-fiber collector 304 for outputting as green microfibers 122. The hurds are moved through the channel 562 of the shaker 562 and output to the cutter 116.

As also shown in FIGS. 28 and 29, the cutter 116 in these embodiments is also coupled to an additive feeder 150 thereabove for introducing bulk additive 154 into the hurds received from the shaker 114, and comprises a rotatable grinder 602 and a grinder base 604 adjacent thereto for cutting the hurds and bulk additive 154 to a selected size. The cutter 116 and in particular the grinder 602 and grinder base 604 also act as a blender for blending the added bulk additive 154 with the hurds in the cutter 116. The plant-processing system 100 thus does not require a separate blender for mixing the bulk additive 154 with the hurds.

In these embodiments, the cutter 116 also comprises two pairs of pivotable arms 594 on the laterally opposite sides for lifting the front cover (not shown) of the cutter 116 for maintenance.

As shown in FIGS. 30 to 33, the grinder 602 has a substantively cylindrical shape with a central axis 612. The grinder 602 comprises a plurality of ridges 614 distributed on the outer surface thereof with each ridge 614 extending laterally thereon at a predefined acute angle α to the axis 612 thereby forming a helical or helical-like cutting head. Each ridge 614 comprises a mounting surface 616 for coupling thereon a cutting blade 618.

For ease of illustration, FIGS. 30 to 33 only show one cutting blade 618 attached to a ridge 614. However, those skilled in the art will appreciate that in various embodiments, a plurality of cutting blades 618 may be coupling to the ridges 614.

FIGS. 34 to 36 show the grinder base 604. As shown, the grinder base 604 comprises a plurality of aligned semi-circular frame components 620 spaced from each other with a plurality of lateral bars 622 therebetween to form a base frame 606 with an arc-shaped inner surface 624 about the grinder 602 when assembled (see FIGS. 37 and 38). In these embodiments, the grinder base 604 also comprises a grinder screen (not shown) coupled to the inner surface 624 of the base frame 606. The grinder screen has a mesh size (i.e., the size of the openings thereof) substantively equals to the above-described selected size of hurds.

In some embodiments, the grinder screen may be replaceable with one having a different mesh size for adjusting the selected size of hurds.

The grinder base 604 also comprises a blade structure 626 adjacent a rear end thereof. The blade structure 626 comprises a base 628 receiving thereon a blade 630 with a mounting piece 632 mounted on top of the blade 630 to fastening the blade 630 at a position adjacent the grinder 602 (not shown in FIGS. 34 to 36). The grinder base 604 uses a pair of pulling springs 634 and a pair of delimiting holes 636 each engaging a setscrew 638 of the mounting piece 632 for fastening the blade 630 in position.

Figure 38:
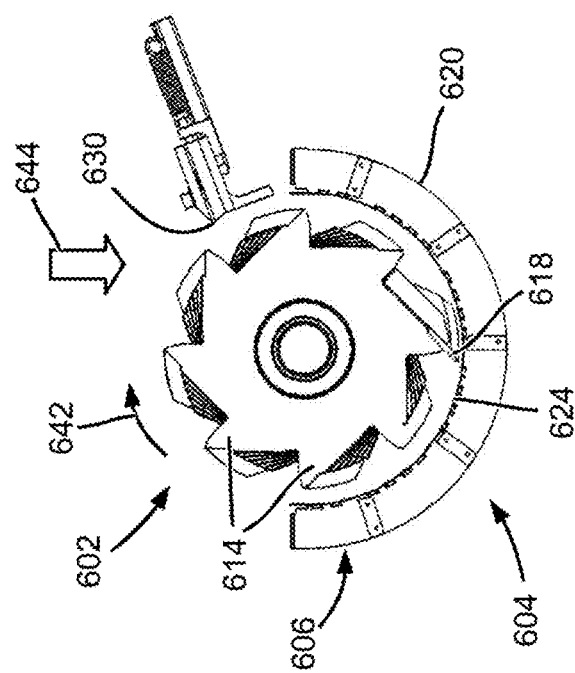
FIG. 38 is a side view of the grinder and the grinder base shown in FIG. 37.
Figure 37:
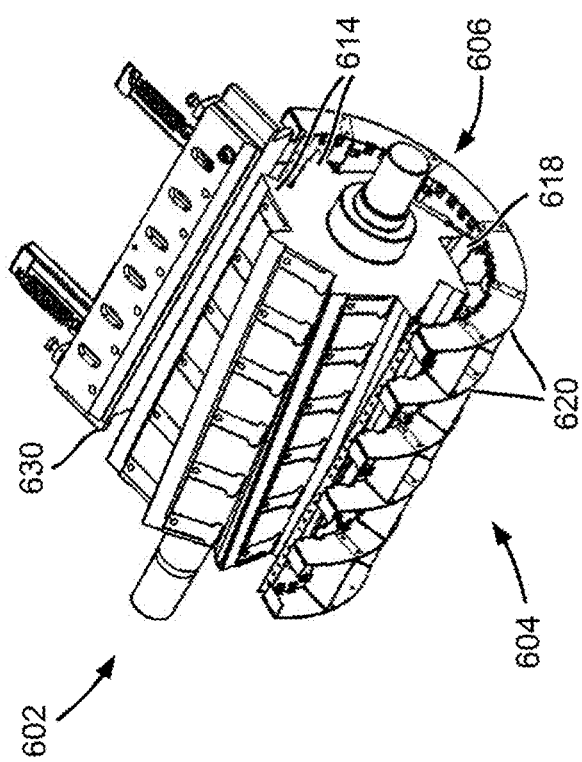
FIG. 37 is a perspective view of the grinder shown in FIG. 30 rotatably mounted on to the grinder base shown in FIG. 34.

FIGS. 37 and 38 show the grinder 602 rotatably installed in the grinder base 604. As shown, the grinder 602 is rotatable at a direction as indicated by the arrow 642, i.e., the lower portion thereof moving forwardly, thereby forcing the hurds falling from thereabove (indicated by the arrow 644) into the gap between the grinder 602 and the grinder base 604 to cycle therein. The blade 630 repeatedly engages with each cutting blade 618 to act like scissors for cutting the hurds in the gap until the hurds are cut to pieces smaller than the mesh size of the grinder screen on the inner surface 624 of the grinder base 604 and fall through the meshes of the grinder screen into the hurds collector 306 (also see FIG. 27A) as granulated hurds 118 (not shown in FIGS. 37 and 38).

In some embodiments, the grinder base 604 may not comprise a grinder screen. Rather, the base frame 606 also acts as a grinder screen with a mesh size (i.e., the size of the openings formed by the frame components 620 and lateral bars 622) substantively equals to the above-described selected size of hurds.

Those skilled in the art will appreciate that the plant-processing system 100 may also comprise other necessary modules such as a control module for controlling the electrical devices such as motors thereof. The detail of these modules are omitted herefrom.

In some embodiments, the plant-processing system 100 may have a machine height of about 16' (i.e., about 16 feet or about 5 meters) and require a facility area of about 1000 square-feet. The plant-processing system 100 may process feedstock bales with round and/or square shapes and/or various rectangular sizes up to 8'×5'×6' (i.e., 2.4 m×1.6 m×1.8 m). In these embodiments, the power requirement is about 60 horsepowers (HP) (i.e., about 50 kilowatts (KW)).

The plant-processing system 100 may produce hurd fiber-particles with lengths ranging between about ⅛" (i.e., about 3 millimeters (mm)) to about 2" (i.e., about 50 mm). The plant-processing system 100 disclosed herein is robust and operation-friendly, and may have a plant-processing capacity of about 2000 lbs/hour (or 10 million to 12 million lbs/year. The hurd cleanliness (i.e., the percentage of non-bast-fiber content) is about 15% and may be reduced to 8% with additional cleaner attachment. Those skilled in the art will understand that the hurd cleanliness described herein is for reference only and may vary depending on on the degree of the plant feedstock "retting", (i.e., wet aging of the plant affecting the fungus-induced bast/hurd delamination).

Conventional decorticators employ a hammer mill or a hammer mill-like mechanism which uses a beating action to separate bast fiber from hurd. Such an action may damage bast fibers and cause attrition to both fibers and hurds thereby leading to significant loses as dust (e.g., 25% to 40% loss). Moreover, damage to bast fibers destroys the structural integrity of the fiber bundles required for reinforcement applications.

Attrition of hurds leads to production of powdered hurds which contaminate the CBD-rich green microfibers and effectively make the separation of clean CBD-rich green mass difficult or even impossible.

Compared to conventional decorticators, the plant-processing systems disclosed herein employ high-speed kinematic action to separate hemp feedstock into three separate streams (i.e., bast fibers, hurds, and green microfibers rich in CBD and other bio-nutrients).

The structural integrity and strength of bast fibers 112 are substantively maintained which may be required in composite-material applications such as concrete and other applications using bast fibers as a reinforcement material.

The hurds 118 produced by the plant-processing system 100 are cleaner than those produced by conventional systems. In some embodiments, the plant-processing system 100 may comprise further processing modules for producing hurd products with any suitable particle size (within a narrow size distribution).

The green microfibers 122 produced by the plant-processing system 100 are nutrient rich (e.g., rich in CBD, protein, carbohydrates, dietary fiber, and other natural bio-nutrients including terpenes, lignin, glucose, hemi-cellulose and pectin) and may be further processed into a variety of high-value engineered products.

Thus, the green microfibers 122 significantly increase the value of the production thereby enabling a high margin and short-time payback business model. Moreover, compared to conventional decortication systems, the systems disclosed herein have a lower cost per ton or per hour of throughput while producing higher-value products.

Those skilled in the art will appreciate that various alternative embodiments are readily available. For example, some of the above-described modules may be combined with conventional modules and systems for processing plant materials.

In above embodiments, the decorticator 110 comprises two drums 244 and 248. In some embodiments, the decorticator 100 may comprise only one drum 224 or 248.

Figure 39:
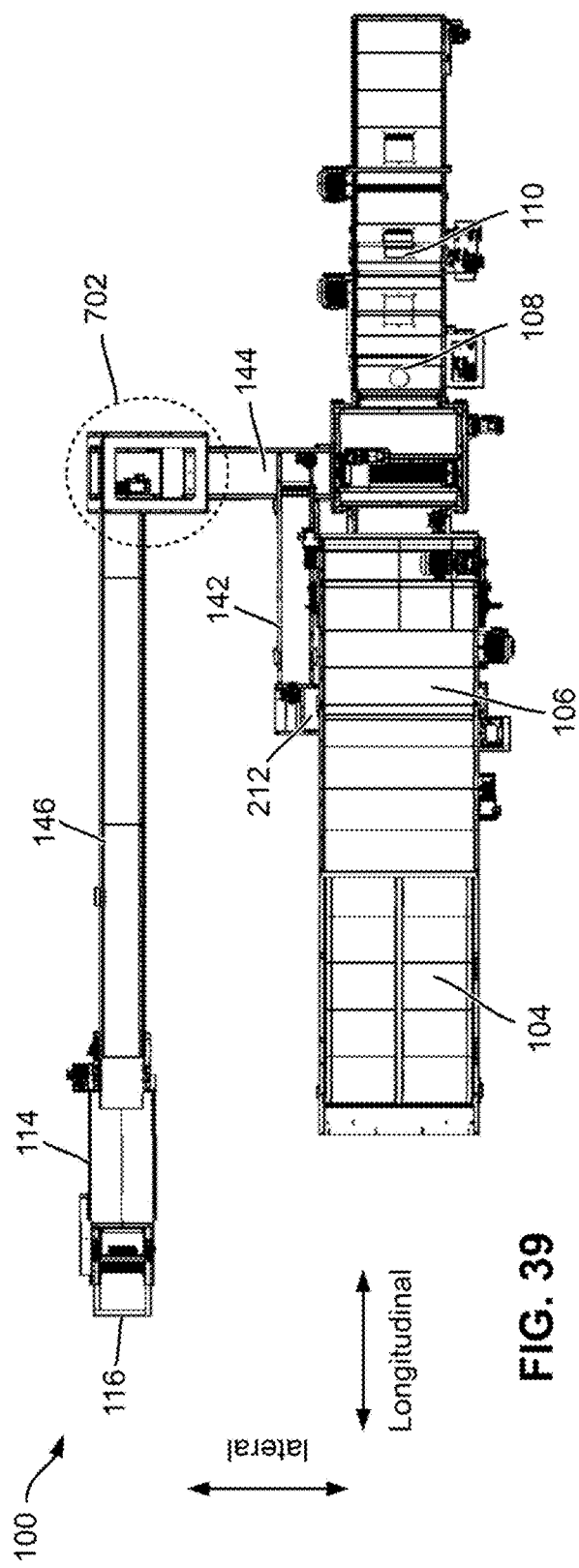
FIG. 39 is a plan view of a plant-processing system, according to some embodiments of this disclosure, the plant-processing system comprising an attrition module.
Figure 40:
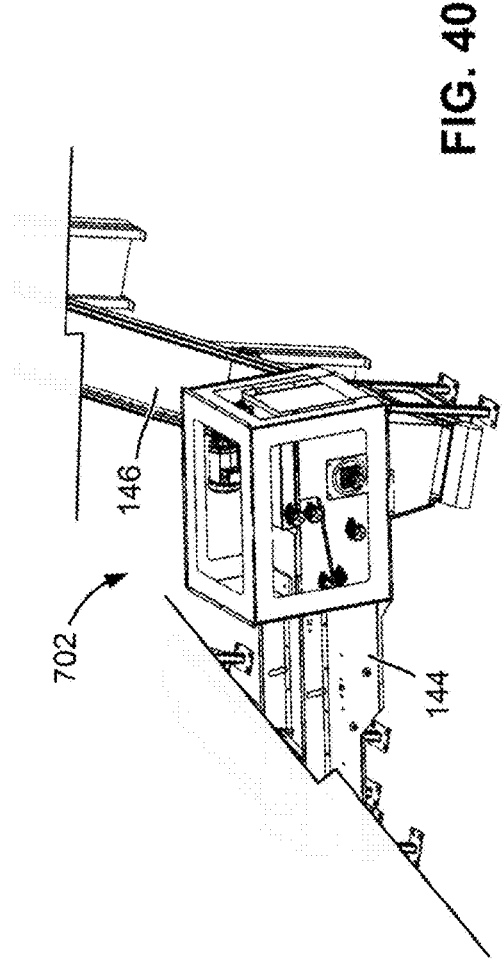
FIG. 40 is a perspective view of the attrition module of the plant-processing system shown in FIG. 39.

FIG. 39 shows a plant-processing system 100 according to some embodiments of this disclosure. The plant-processing system 100 in these embodiments is similar to that shown in FIG. 7 except that the plant-processing system 100 in these embodiments further comprises an attrition module 702 coupled to the end of the transverse conveyor 144 (also see FIG. 40).

Figure 42:
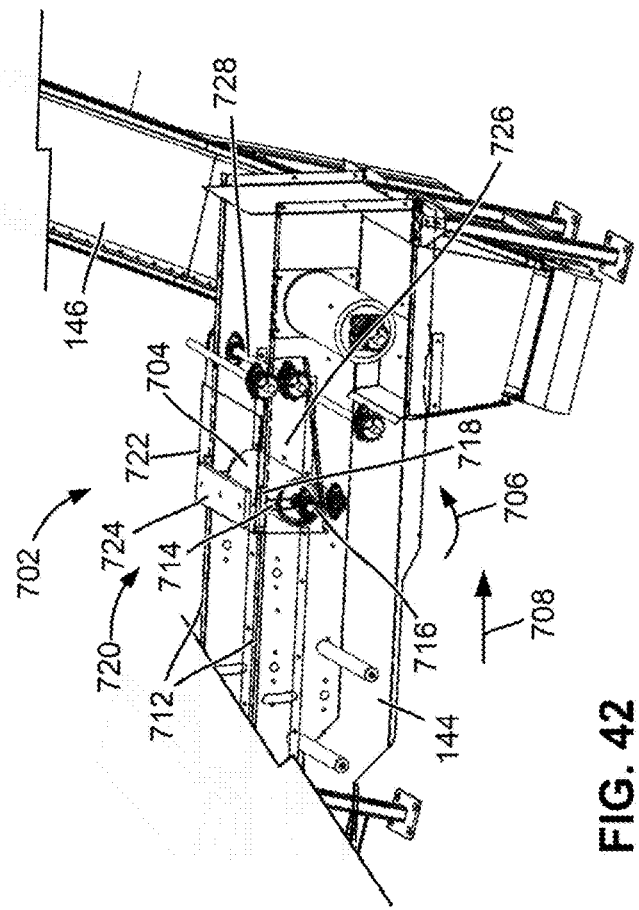
FIG. 42 is a perspective view of the attrition module shown in FIG. 40 with some framing components removed and some sidewalls thereof shown in "transparent" for illustrating the internal structure thereof.
Figure 41:
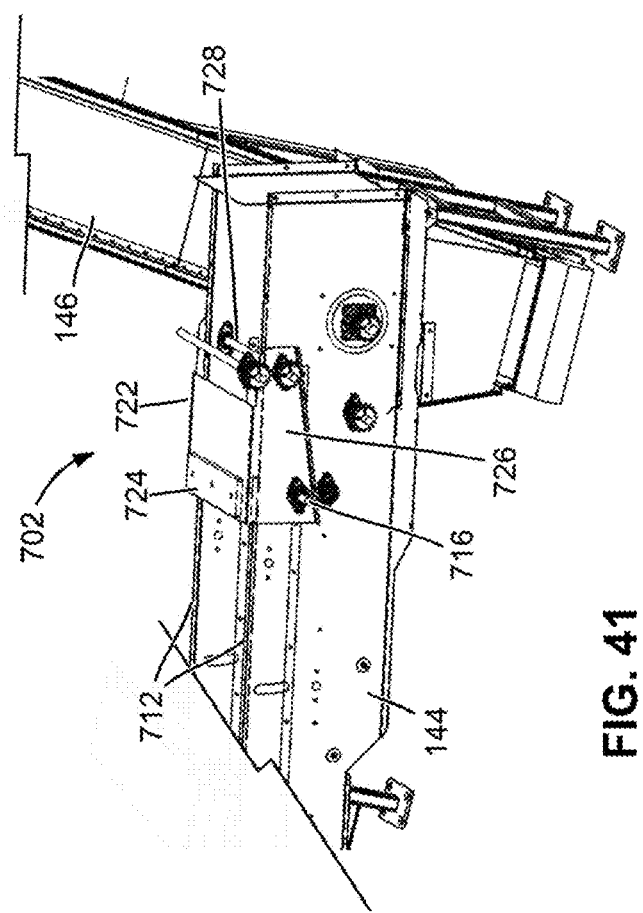
FIG. 41 is a perspective view of the attrition module shown in FIG. 40 with some framing components removed for illustrating the internal structure thereof.

FIGS. 41 and 42 show the structure of the attrition module 702. For ease of illustration, FIG. 42 omits some components including the endless conveyor belt of the transverse conveyor 144 and some framing components, and shows the sidewalls 712 and the weight holder 722 (described later) in "transparent".

As shown in FIGS. 41 and 42, the attrition module 702 comprises an attrition roller 704 located above the endless conveyor belt (not shown) of the transverse conveyor 144 in contact therewith or at a small distance thereto. The attrition roller 704 may comprise a rough outer surface and rotate in a direction as indicated by the arrow 706, i.e., the lower portion thereof moving towards the output end (e.g., towards the end of the transverse conveyor 144) such that its lower part moves in a direction opposite to the moving direction of the endless conveyor belt (indicated by the arrow 708) of the transverse conveyor 144 to attrite the hurds conveyed thereon when the hurds pass through the gap between the attrition roller 704 and the endless conveyor belt of the transverse conveyor 144.

In these embodiments, the sidewalls 712 of the transverse conveyor 144 (which are also the sidewalls of the attrition module 702) comprise a pair of aligned notches 714 for upwardly movably receiving therein the axis 716 of the attrition roller 704 such that the attrition roller 704 may be forced to move upwardly when a large clump of hurds are passing thereunder and may move downwardly when the large clump of hurds has passed therethrough. A pair of locking pieces 718 mounted to the top of respective notches 716 prevent the attrition roller 704 from being forced out of the notches 716.

During attrition, the attrition roller 704 applies a downward force (from the weight thereof) to the hurds thereunder. In these embodiments, the attrition module 702 also comprises a weight structure 720 coupled to the attrition roller 704 for configuring the weight thereof and the downward force applied to the hurds thereunder.

As shown in FIGS. 41 and 42, the weight structure 720 comprises a weight holder 722 carrying a weight block 724. The weight holder 722 is in the form of a cap having a pair of sidewalls 726 coupling the axis 716 of the attrition roller 704 thereto. The weight holder 722 is coupled to the sidewalls 712 of the transverse conveyor 144 and is movable about a pivot 728 adjacent a rear end thereof.

In operation, the transverse conveyor 144 conveys the hurds and micro-biomass to pass under the rotating attrition roller 704, the total weight of the weight structure 720 and the attrition roller 704 applies a downward force to the hurds thereunder for achieving a desire attrition result. In some embodiments, the weight block 724 may be replaceable for adjusting the total weight and the downward force.

Figure 43:
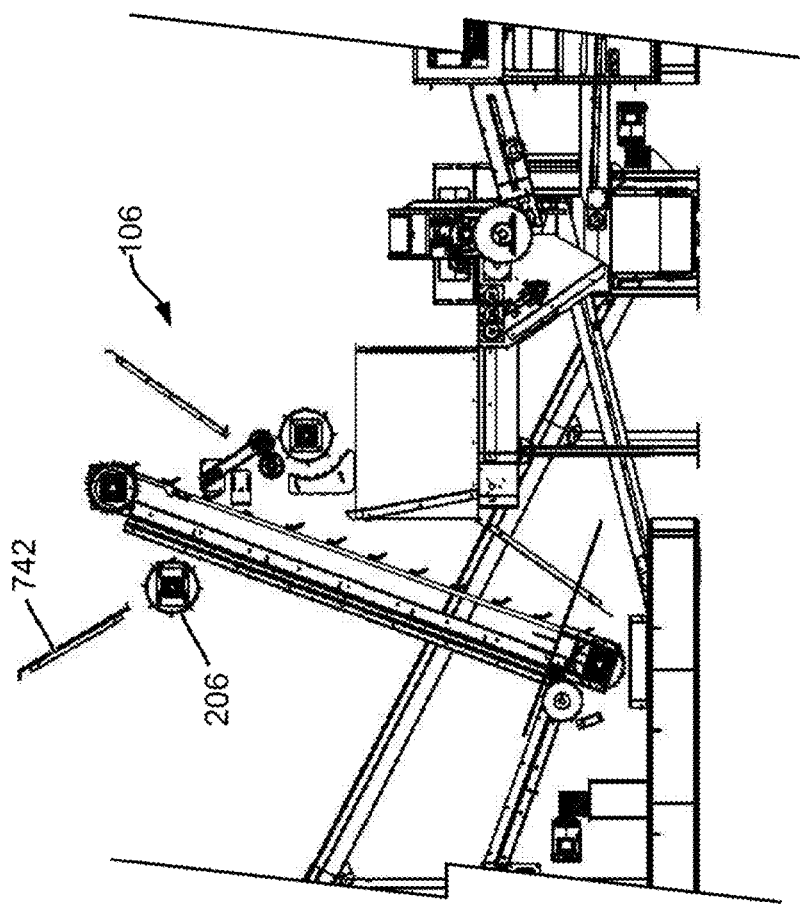
FIG. 43 is a side view of a bale opener of the plant-processing system, according to some embodiments of this disclosure.

FIG. 43 shows a bale opener 106 of the plant-processing system 100 according to some embodiments of this disclosure. The bale opener 106 in these embodiments is similar to that shown in FIGS. 12 to 15 except that the bale opener 106 in these embodiments further comprises a chute 742 extending upwardly and forwardly from a position adjacent the regulating drum 206 for preventing the plant stalks from being thrown out of the bale opener 106 by the regulating drum 206.

Figure 44:
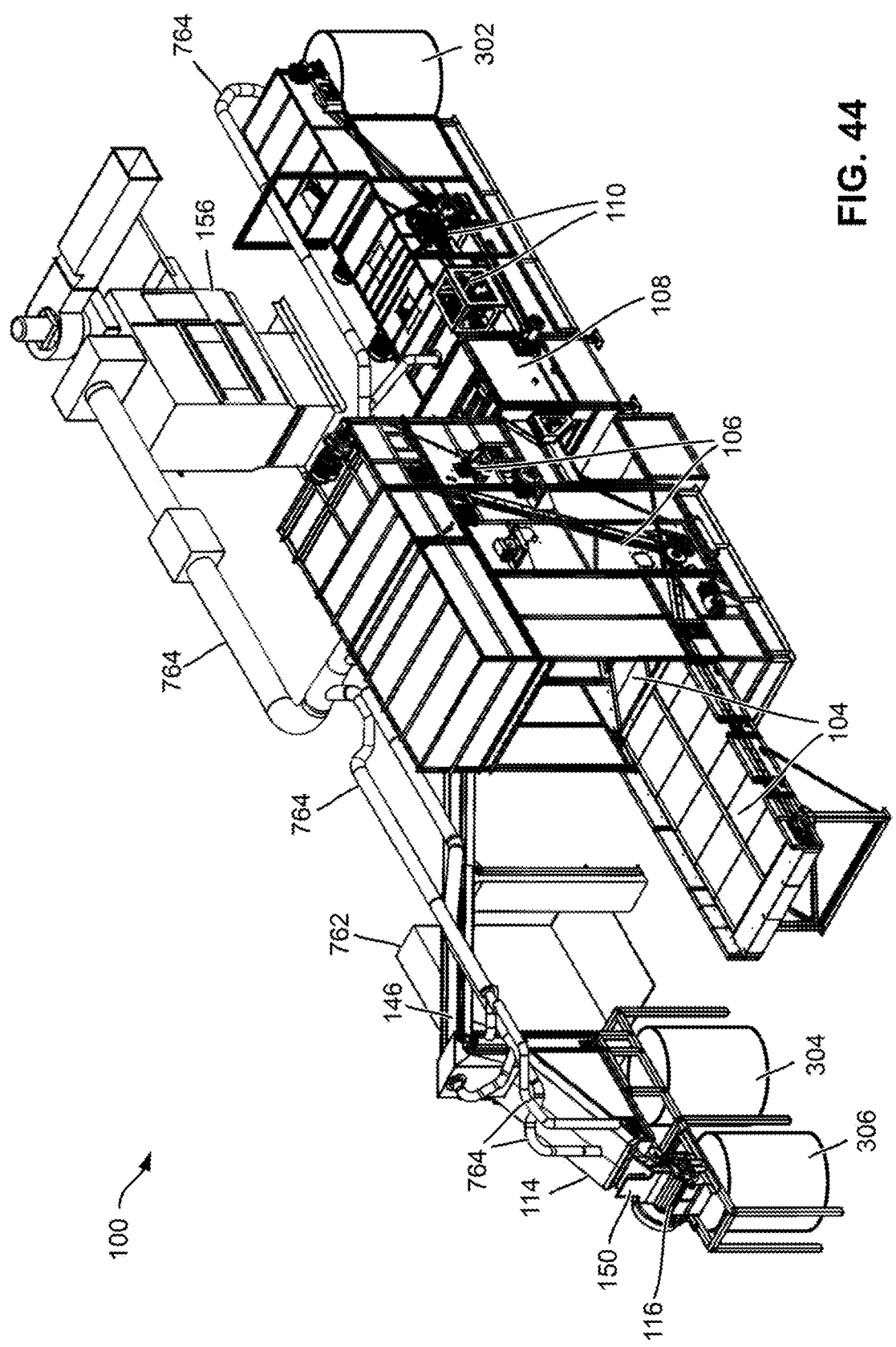
FIG. 44 is a perspective view of a plant-processing system, according to some embodiments of this disclosure.

FIG. 44 is a perspective view of the plant-processing system 100 according to some alternative embodiments. The plant-processing system 100 in these embodiments is similar to that shown in FIGS. 7 to 10. However, in these embodiments, the plant-processing system 100 comprises a separate control station 762 for controlling the electrical components such as motors and the like of the plant-processing system 100.

Moreover, each of the modules of the plant-processing system 100 such as the bale opener 106, crusher 108, decorticator 110, shaker 114, cutter 116, additive feeder 150, and attrition module 702 (not shown) may comprise necessary walls forming an enclosure receiving the respective module therein to prevent dusts from escaping therefrom. Each of the conveyors such as the bypass conveyor 142, transverse conveyor 144, and the inclined conveyor 146 may also comprise necessary walls forming an enclosure receiving the respective conveyor therein to prevent dusts from escaping therefrom.

In these embodiments, the plant-processing system 100 further comprises a plurality of ducts or pipes 764 connecting connect various modules 106, 108, 110, 114, 116, 150, and 702 of the plant-processing system 100 to the dust collector 156 for removing dusts therefrom into the dust collector 156.

In above embodiments, the plant-processing system 100 comprises a shaker 114 having a screen 272 for separating microfibers 122 and the hurds 118. In these embodiments, the shaker 114 is generally a screening module that may be shaken along one or more directions to facilitate the separation of microfibers 122 and the hurds 118.

In some embodiments, the screening module of the plant-processing system 100 is fixed and is not shakable.

Figure 45:
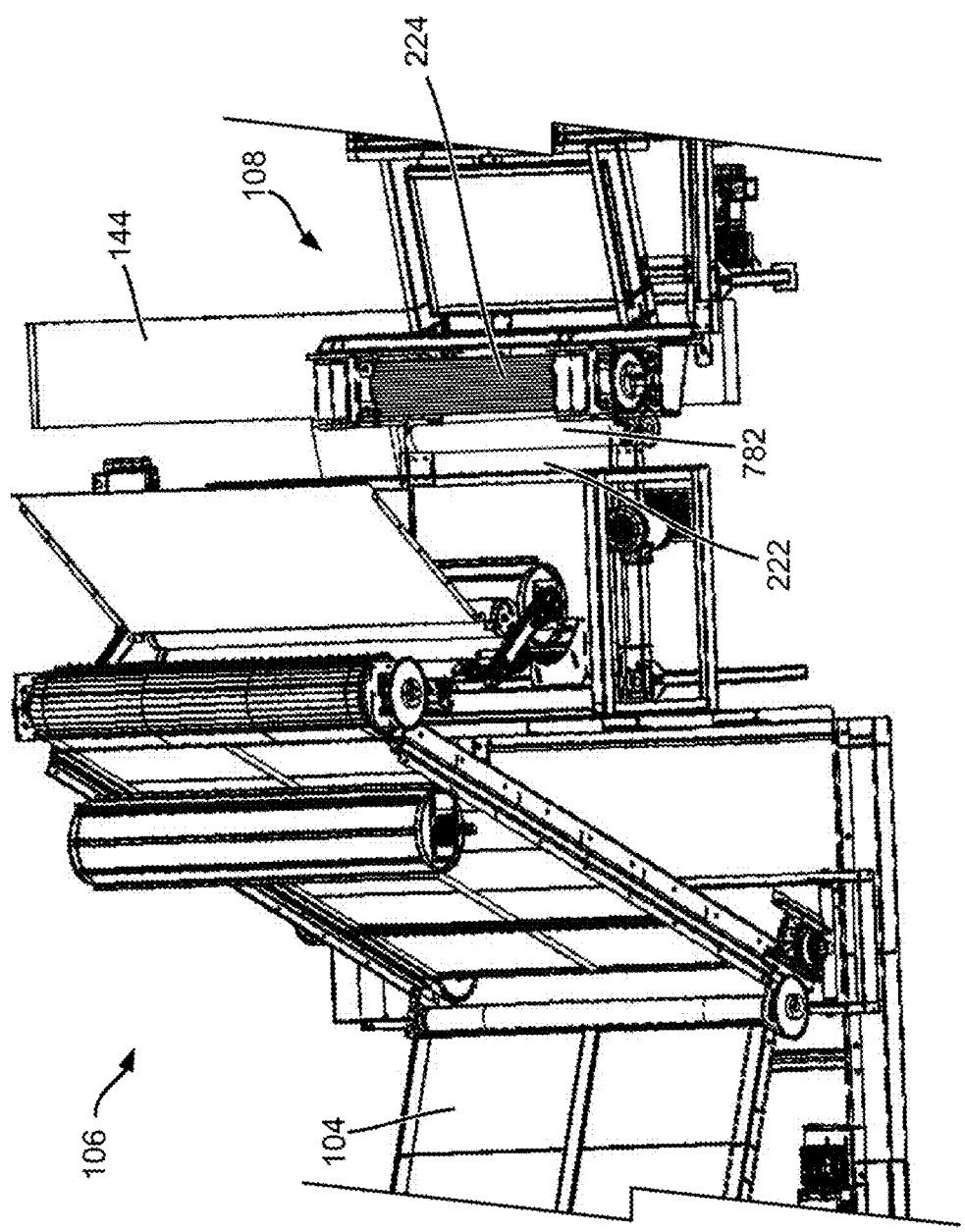
FIG. 45 is a perspective view of a portion of the plant-processing system showing a crusher module thereof, according to some embodiments of this disclosure.

As those skilled in the art will appreciate, the plant stalks may comprise rocks from the field. In some embodiments as shown in FIG. 45, the crusher module 108 also comprises a rock-catching assembly 782 in the form of a roller intermediate the crusher feed conveyor 222 and the crusher rollers 224 with gaps therebetween, for catching rocks that may be in the plant stalks.

As described above, when the separated plant stalks (with some rocks) are output from the bale-opener module 106 onto the crusher feed conveyor 222 for conveying to the crusher 108, rocks are dragged at the bottom of the plant-stalk flow. Generally, plant stocks pass the rock-catching roller 782 and arrive the crusher rollers 224 for crushing as described above.

When a rock arrives the interface between the crusher feed conveyor 222 and the rock-catching roller 782, with a suitable ratio of the rock diameter and the width between the crusher feed conveyor 222 and the rock-catching roller 782, and with a suitable RPM speed of the rock-catching roller 782, the rock is trapped in the gap, rolls therein and moves sideways, and eventually falls therethrough to the ground.

Even if some rocks may pass the gap between the crusher feed conveyor 222 and the rock-catching roller 782, they may be trapped in the gap between the rock-catching roller 782 and the crusher rollers 224, and eventually fall through the gap to the ground.

Although embodiments have been described above with reference to the accompanying drawings, those of skill in the art will appreciate that variations and modifications may be made without departing from the scope thereof as defined by the appended claims.

What is claimed is:

1. A system for processing plant materials and outputting at least a first, a second, and a third product, said plant materials comprising at least plant stalks, said plant stalks comprising at least bast fibers, the system comprising:
    a crusher module for disrupting the plant materials without breaking or damaging the bast fibers thereof, thereby obtaining disrupted plant stalks and a first plant-remainder;
    a decorticator module coupled to the crusher module for separating the disrupted plant stalks into the bast fibers and a second plant-remainder, and outputting the bast fibers as the first product;
    a screening module having an input coupled to the decorticator module for receiving from the decorticator module at least the second plant-remainder, a first output for outputting a first portion of the at least second plant-remainder as the third product of microfibers, and a second output for outputting a second portion of the at least second plant-remainder as hurds; and
    a cutter module coupled to the second output of the screening module for sizing the hurds outputted therefrom and outputting the sized hurds as the second product.

2. The system of claim 1, wherein the screening module comprises a first end coupled to the decorticator module, a second end coupled to the cutter module, and a screen intermediate the first and the second ends;
    wherein the screening module is configured for:
    receiving from the decorticator module at least the second plant-remainder onto the screen,
    moving the at least second plant-remainder towards the second end of the screen module,
    passing the first portion of the at least second plant-remainder through the screen for outputting as the third product of microfibers, and
    moving second portion of the at least second plant-remainder on the screen to the second end of the screen module for outputting as the second product of hurds.

3. The system of claim 1, wherein the screening module is inclined having a higher end adjacent the first end of the screen module and a lower end adjacent the second end of the screen module.

4. The system of claim 1, wherein the screening module is shakable along at least one direction.

5. The system of claim 1, wherein the crusher module is also coupled to the screening module for outputting the first plant-remainder thereto.

6. The system of claim 1, wherein the decorticator module is coupled to the screening module via at least a first conveyor module for outputting the second plant-remainder thereto.

7. The system of claim 1, wherein the decorticator module is coupled to the screening module via the first conveyor module and a second conveyor module coupled to the first conveyor module.

8. The system of claim 7, wherein the second conveyor module is an inclined conveyor having a first end coupled to the first conveyor module and a second end at an elevation higher than the first end.

9. The system of claim 6, wherein the crusher module is coupled to the first conveyor module for coupling to the screening module.

10. The system of claim 1, further comprising:
    a bale-opener module coupled to the crusher module for receiving bales, extracting the plant materials from the received bales, and outputting the extracted plant materials to the crusher module.

11. The system of claim 10 further comprising:
    an input conveyor module having an end portion rearwardly and downwardly extending to the bale-opener module.

12. The system of claim 10, wherein the bale-opener module is also coupled to the screening module for outputting a third plant-remainder obtained during the extraction of the plant materials from the received bales.

13. The system of claim 10, wherein the decorticator module is coupled to the screening module via at least a first conveyor module for outputting the second plant-remainder thereto.

14. The system of claim 13, wherein the decorticator module is coupled to the screening module via the first conveyor module and a second conveyor module coupled to the first conveyor module.

15. The system of claim 14, wherein the second conveyor module is an inclined conveyor having a first end coupled to the first conveyor module and a second end at an elevation higher than the first end.

16. The system of claim 13, wherein the crusher module is coupled to the first conveyor module for coupling to the screening module.

17. The system of claim 13, wherein the bale-opener module is coupled to a third conveyor module and the third conveyor module is coupled to the first conveyor module for coupling the bale-opener module to the screening module.

18. The system of claim 1, further comprising:
an attrition module intermediate and coupled to the screening module and at least the decorticator module for receiving at least the second plant-remainder from the decorticator module, attriting the received plant-remainder, and outputting the attrited plant-remainder to the screening module;
wherein the attrition module comprises an attrition roller for pressing the received plant-remainder passing thereunder, for attriting the received plant-remainder.

19. The system of claim 18, wherein the decorticator module is coupled to the screening module via at least a first conveyor module for outputting the second plant-remainder thereto.

20. The system of claim 19, wherein the crusher module is coupled to the first conveyor module for coupling to the screening module.

21. The system of claim 19, wherein the attrition module is intermediate and coupled to the first conveyor module and the screening module.

22. The system of claim 19, wherein the decorticator module is coupled to the screening module via the first conveyor module and a second conveyor module coupled to the first conveyor module.

23. The system of claim 22, wherein the second conveyor module is an inclined conveyor having a first end coupled to the first conveyor module and a second end at an elevation higher than the first end.

24. The system of claim 22, wherein the attrition module is intermediate and coupled to the first and second conveyor modules.

25. The system of claim 1 further comprising:
an additive feeder module coupled to the cutter module for adding bulk additive thereto.

26. The system of claim 1, further comprising:
a dust collection structure for collecting dusts generated in the system and separating the collected dusts from the first, the second, and the third products.

27. The system of claim 26, wherein the dust collection structure is coupled to each of the modules via a plurality of ducts.

28. The system of claim 27, wherein each of the modules comprises walls forming an enclosure receiving the module therein for preventing dusts from escaping the module.

* * * * *